(12) United States Patent
Hashimoto et al.

(10) Patent No.: US 7,107,488 B2
(45) Date of Patent: Sep. 12, 2006

(54) ELECTRONIC CONTROL UNIT INCLUDING MONITORING CONTROL CIRCUIT

(75) Inventors: Kohji Hashimoto, Tokyo (JP); Katsuya Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 462 days.

(21) Appl. No.: 10/758,003

(22) Filed: Jan. 16, 2004

(65) Prior Publication Data

US 2005/0022060 A1   Jan. 27, 2005

(30) Foreign Application Priority Data

Jul. 9, 2003   (JP) ............................ P2003-194575

(51) Int. Cl.
*G06F 11/00* (2006.01)
(52) U.S. Cl. ..................... 714/25; 714/30; 714/37; 714/41; 714/51
(58) Field of Classification Search ............... 714/25, 714/28–31, 37.41, 51.55
See application file for complete search history.

(56) References Cited

U.S. PATENT DOCUMENTS 5,271,474 A * 12/1993 Nishimoto et al. ......... 180/446
6,883,123 B1 * 4/2005 Hashimoto et al. ........... 714/55
2002/0095620 A1 * 7/2002 Kuwayama .................. 714/32

FOREIGN PATENT DOCUMENTS

| DE | 37 04 318 C2 | | 8/1988 |
|---|---|---|---|
| JP | 02039398 A | * | 2/1990 |
| JP | 5-81222 A | | 4/1993 |
| JP | 5-97042 A | | 4/1993 |
| JP | 9-162814 A | | 6/1997 |
| JP | 2001-227402 A | | 8/2001 |
| JP | 2002 108835 A | | 4/2002 |

* cited by examiner

*Primary Examiner*—Robert W. Beausoliel
*Assistant Examiner*—Emerson Puente
(74) *Attorney, Agent, or Firm*—Sughrue Mion, PLLC

(57) ABSTRACT

A microprocessor 20a controls an electrical load group 12 responsive to content of a non-volatile program memory 25a and operation state of an input sensor group 11. A monitoring control circuit section 30a sequentially transmits a large number of question items with an inquiry packet, and compares response content from the microprocessor 20a with correct answer information to carry out an error determination. The microprocessor 20a diagnoses an interval of receiving an inquiry packet to monitor in reverse the monitoring operation of the monitoring control circuit section 30a. Thus, in an electronic control unit having a microprocessor built-in, a monitoring control circuit is obtained that alternatively executes at regular intervals a part of control programs to carry out operation inspection during operation.

20 Claims, 13 Drawing Sheets

10a : ELECTRONIC CONTROL UNIT
25a : NON-VOLATILE PROGRAM MEMORY
29, 49 : SERIAL INTERFACE CIRCUIT
30a : MONITORING CONTROL CIRCUIT SECTION
40 : DATA PROCESSING CIRCUIT
WD : WATCHDOG SIGNAL 281b-284b : SIMULATION-OPERATION-EXECUTION PROCESSING PROGRAM

ELECTRONIC CONTROL UNIT INCLUDING MONITORING CONTROL CIRCUIT

BACKGROUND OF THE INVENTION

1. Field of the Invention

The present invention relates to an electronic control unit having a microprocessor built-in and, more particularly, to improvements of an electronic control unit to which a monitoring control circuit is added in order to improve safety in control.

2. Description of the Related Art

To monitor operation of a microprocessor with a watchdog signal, or to check contents in a program memory during the operation, several attempts have been proposed. For example, the Japanese Patent Publication (unexamined) No. 97042/1993 proposed an art in which a main CPU has function to monitor cycles of a watchdog pulse signal that is outputted from a sub CPU, and detect errors of the sub CPU based on the results thereof; and likewise the sub CPU has function to monitor cycles of a watchdog pulse signal that is outputted from the main CPU, and detect errors of the main CPU based on the results thereof. Thus, the main CPU and the sub CPU detect errors with respect to each other.

The Japanese Patent Publication (unexamined) No. 81222/1993 proposed run-away monitoring means in a system consisting of two CPUs of a main CPU and a sub CPU. In this run-away monitoring means, operation of the main CPU is monitored by a watchdog timer, which is provided outside of the main CPU, and operation of the sub CPU is monitored by the main CPU.

The Japanese Patent Publication (unexamined) No. 227402/2001 proposed a further art in which contents of a ROM memory storing a control program, discrimination data or the like therein is subject to time division to carry out a sum check thereof in accordance with a processing load of a microprocessor. Thus, presence or absence of any error in the control program is detected.

In association with this invention, the Japanese Patent Publication (unexamined) No. 162814/1997 disclosed an art in which a communication-monitoring device includes: a communication control section that controls a data communication and outputs an error notification signal upon detecting a communication error; an error counter that performs up-count in accordance with the input of an error notification signal; and annunciation section that announces the communication error responsive to the fact that a count value of the error counter has reached a positive predetermined value. This communication-monitoring device further includes counter subtraction means for counting down a count value of the error counter responsive to the fact that the control of data communication is normally carried out in the communication control section.

Further, the Japanese Patent Publication (unexamined) No. 97042/1993 and the Japanese Patent Publication (unexamined) No. 81222/1993 disclosed an art mainly intending to monitor run-away of a main CPU or a sub CPU, which carries out no monitoring as to contents of the control by the CPU.

Furthermore, the Japanese Patent Publication (unexamined) No. 227402/2001 discloses an art in which sum check of contents of a program memory relating to the control content is conducted, so that improvement in reliability of the control is expected. This is, however, a self-diagnosis function to the end. Thus, there remains a disadvantage in that the suspected one checks its suspected region and it is not any diagnosis of the very control operation.

In addition, the Japanese Patent Publication (unexamined) No. 162814/1997 intends to provide countermeasure after occurrence of any communication error, which is not intended to detect any error in control operation.

SUMMARY OF THE INVENTION

A first object of the present invention is to provide an electronic control unit of a high safety in which operation check of a control program of a microprocessor to be a target of a monitoring control is carried out by means of a monitoring control circuit section used in combination and connected to the microprocessor.

A second object of the invention is to provide an electronic control unit including a monitoring control circuit capable of preventing reduction in safety of the whole system resulted from complication of a system owing to the fact that a monitoring control circuit section is used in combination.

An electronic control unit having a monitoring control circuit according to the invention includes: a non-volatile program memory, an operation processing RAM memory, an input interface circuit to which an input sensor group is connected, an output interface circuit to which an electrical load group is connected, and a microprocessor controlling the mentioned electrical load group responsive to a content of a control program that is stored in the mentioned non-volatile program memory, and an operation state of the mentioned input sensor group.

This electronic control unit further includes:

a monitoring control circuit section that is connected to the mentioned microprocessor via a pair of serial interface circuits, and includes inquiry packet transmission means for sequentially transmitting regularly question to the mentioned microprocessor; correct answer information storage means to the mentioned question information; and error determination means for comparing answer information based on the mentioned question information with correct answer information that is stored in the mentioned correct answer information storage means to determine presence or absence of any error; and under-monitoring processing means that is an under-monitoring processing program stored in the mentioned non-volatile program memory in addition to the control program for input/output control, and includes: simulation-operation-execution processing means that is executed based on the question information having been transmitted by the mentioned inquiry packet transmission means; response packet transmission means for transmitting an execution result of the mentioned simulation-operation-execution processing means as an answer information to the mentioned monitoring control circuit section; and receiving interval error processing means that is reverse monitoring means for restarting, or alarming and stopping the mentioned monitoring control circuit section when a receiving interval of the mentioned inquiry packet is abnormal. In this electronic control unit, an under-test target program that is contained in the mentioned control program and a simulation-operation-execution processing program serving as simulation-operation-execution processing means and contained in the mentioned under-monitoring processing program include at least some common program.

As a result, a part of the control program of the microprocessor is executed and monitored by a simulation operation to be capable of determining presence of absence of any error, and whether or not the monitor control circuit section normally operates is monitored in reverse by the microprocessor, thereby enabling to improve safety of the whole control unit.

Another electronic control unit having a monitoring control circuit according to the invention also includes: a non-volatile program memory, an operation processing RAM memory, an input interface circuit to which an input sensor group is connected, an output interface circuit to which an electrical load group is connected, and a microprocessor controlling the mentioned electrical load group responsive to a content of the mentioned non-volatile program memory, and an operation state of the mentioned input sensor group.

This electronic control unit further includes a monitoring control circuit that consists of:

a monitoring control circuit section that is connected to the mentioned microprocessor via a pair of serial interface circuits, and includes inquiry packet transmission means for sequentially transmitting regularly question information to the mentioned microprocessor; correct answer information storage means to the mentioned question information; and error determination means for comparing answer information based on the mentioned question information with correct answer information that is stored in the mentioned correct answer information storage means to determine presence or absence of any error; and under-monitoring processing means that is an under-monitoring processing program stored in the mentioned non-volatile program memory, and that consists of: simulation-operation-execution processing means that is executed based on the question information having been transmitted by the mentioned inquiry packet transmission means; response packet transmission means for transmitting an execution result of the mentioned simulation-operation-execution processing means as an answer information to the mentioned monitoring control circuit section; and receiving interval error processing means that is reverse monitoring means for restarting, or alarming and stopping the mentioned monitoring control circuit section when a receiving interval of the mentioned inquiry packet is abnormal.

This electronic control unit further includes:

a watchdog timer that generates a reset pulse signal when a pulse width of a watchdog signal, being a pulse train that the mentioned microprocessor generates, exceeds a predetermined value to restart, or alarm and stop the mentioned microprocessor and the mentioned monitoring control circuit section; and in which operation of the mentioned microprocessor is monitored by the mentioned watchdog timer and the mentioned monitoring control circuit section, and the mentioned microprocessor monitors in reverse monitoring control operation of the mentioned monitoring control circuit section.

As a result, the operation of the microprocessor is carried out and monitored by the simulation-operation-execution processing program so as to be capable of determining presence of absence of error, and whether or not the monitor control circuit section normally operates is monitored in reverse by the microprocessor, thereby enabling to improve safety of the whole control unit. Furthermore, even if the entire system is more complicated resulted from the addition of the monitoring control circuit section, run-away of the microprocessor is monitored by means of the watchdog timer thereby enabling to improve safety further.

The foregoing and other objects, features, aspects and advantages of the present invention will become more apparent from the following detailed description of the present invention when taken in conjunction with the accompanying drawings.

DETAILED DESCRIPTION OF THE INVENTION

Detailed Description of Constitution of Embodiment 1

Figure 1:
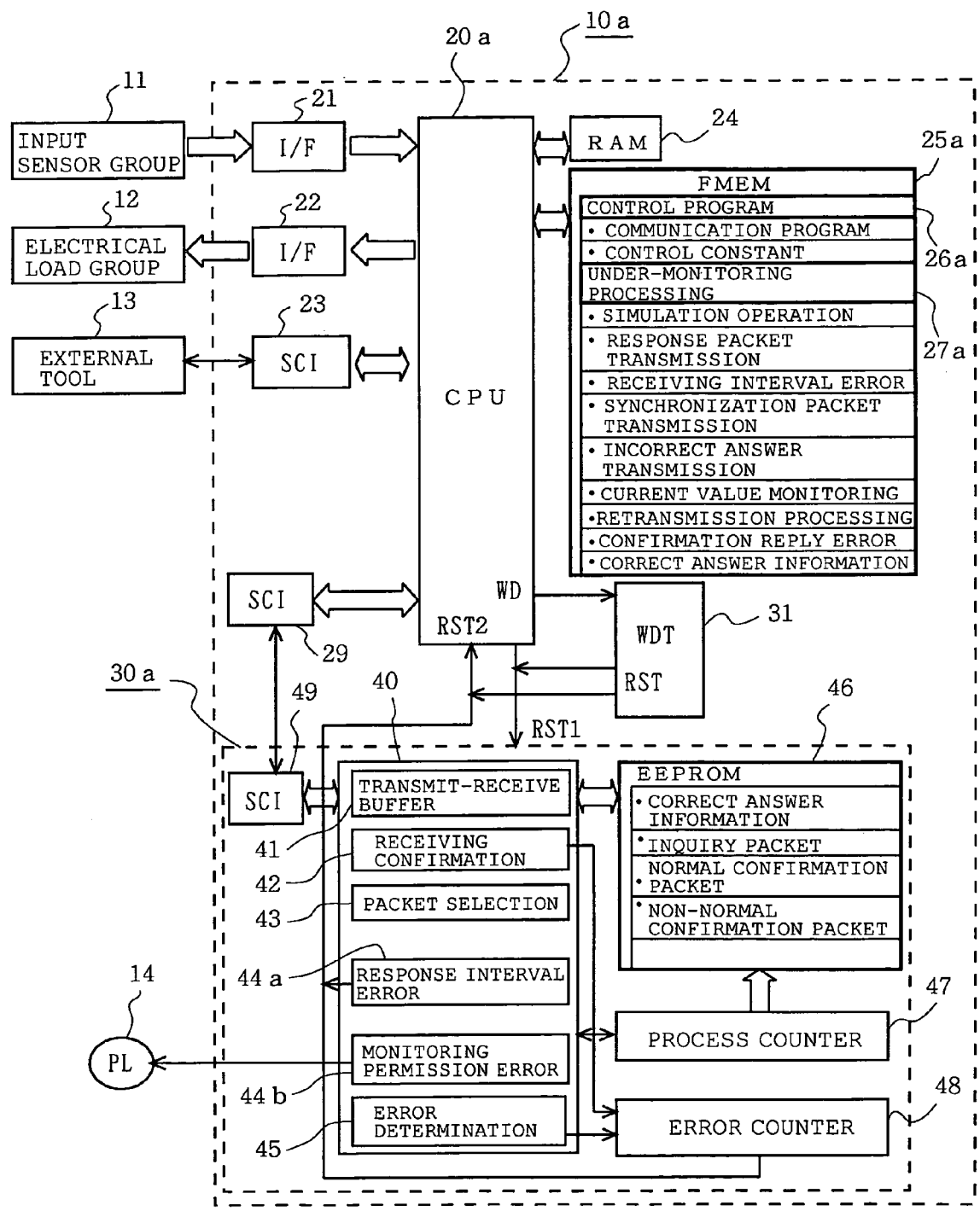
FIG. 1 is a schematic diagram showing an entire electronic control unit including a monitoring control circuit according to a first preferred embodiment of the present invention.

FIG. 1 is an entire schematic diagram showing an electronic control unit including a monitoring control circuit according to a first preferred embodiment of the present invention. With reference to FIG. 1, there is shown an electronic control unit 10a constructed on a piece of electronic substrate such that a main component thereof is a microprocessor 20a. This electronic control unit 10a includes, as components connected to outside thereof, an input sensor group 11 containing an ON/OFF signal or an analog signal, an electrical load group 12 driven by the electronic control unit 10a, an external tool 13 serially connected to the electronic control unit 10a, and an alarm display 14. The external tool 13 is connected to the electronic control unit 10a via a detachable connector, not shown, at the time of delivery of products or a maintenance inspection thereof, and functions to transfer to and write a control program 26a or an under-monitoring processing program 27a in a non-volatile program 25a to be described later.

Further, the electronic control unit 10a includes, as an internal component thereof, the microprocessor 20a bus-connected to various interface circuits and memories, and an input interface circuit 21 provided between this microprocessor 20a and the input sensor group 11. With respect to an analog input sensor, an AD converter, not shown, is used. An output interface circuit 22 is connected between the microprocessor 20a and the electrical load group 12. A tool interface circuit 23 is connected between the microprocessor 20a and the external tool 13. The electronic control unit 10a includes a RAM memory 24 for an operation processing, and a non-volatile memory 25a, for example, a flash memory. Various programs, which will be described in detail with reference to FIGS. 5 to 11, are stored in the foregoing program memory. In addition, the electronic control unit 10a includes a serial interface circuit 29, specifically a serial-parallel converter, provided in order to carry out an interactive serial communication between the microprocessor 20a and a monitoring control circuit section 30a to be described later.

Further, as contents of the above-mentioned non-volatile program memory 25a, there are a control program 26a and an under-monitoring processing program 27a. The control program 26a consists of a control program for carrying out an input/output control as a principal content, and a serial communication program with the external tool 13 and the monitoring control circuit section 30a to be described later, or a control constant, for example, a threshold data for a comparison processing to be used at the input/output control. In addition, the under-monitoring processing program 27a is to carry out the monitoring control in cooperation with the monitoring control circuit section 30a to be described later. The under-monitoring processing program 27a consists of a simulation-operation-execution processing program, a response packet transmission program, a receiving interval error processing program, a first and second synchronization packet transmission program, an incorrect answer transmission selection program, a current-value monitoring program of an error counter, a retransmission processing program of a response packet, a confirmation reply error processing program and the like.

The monitoring control circuit section 30a is added to the electronic control unit 10a, the main component of which is the microprocessor 20a, and which controls the electrical load 12 responsive to contents of the control program 26a in the non-volatile memory 25a and an operation state of the input sensor group 11. A watchdog timer 31 monitors a pulse width of a watchdog signal WD that is a pulse train generated by the microprocessor 20a, generates a reset pulse signal RST when the foregoing pulse width exceeds a predetermined value, and causes the microprocessor 20a and the monitoring control circuit section 30a to restart.

The monitoring control circuit section 30a includes, as an internal component thereof, a data processing circuit 40; a non-volatile data memory 46 such as EEPROM memory; a process counter 47 a current value of which changes in a cycle of 1–16, and specifies a circulation number n=1–16, described later; an error counter 48 the initial value of which is 11 and which is arranged not to be 0 and less than 0, and furthermore which generates a count-up output for the determination of error when a current value comes to be not less than 13, and resets the microprocessor 20a with a reset pulse signal RST2 to restart it; and a serial interface circuit 49, specifically a serial-parallel converter that is paired with the serial interface circuit 29.

The above-mentioned data processing circuit 40 includes as components thereof a transmit-receive buffer memory 41 in which data having been transmitted from the microprocessor 20a is temporarily stored, and data to be transmitted to the microprocessor 20a are temporarily stored; receiving-confirmation means 42 for conducting the sum check of contents of the received data having been temporarily stored in the transmit-receive buffer memory 41; receiving-confirmation-response means 43 for selecting a normal confirmation packet (ACK) of a non-normal confirmation packet (NACK) as a reply packet corresponding to a content of the received data; response interval error processing means 44a for resetting the microprocessor 20a when a receiving interval of a response packet to be transmitted from the microprocessor 20a is abnormal; monitoring permission error processing means 44b for bringing an alarm display 14 when the microprocessor 20a gives no permission of the start of a monitoring operation with respect to the monitoring control circuit section 30a even if a predetermined time period has passed after the start of operation; and error discrimination means 45 for discriminating whether or not a content of a response packet that the microprocessor 20a transmits, is appropriate relative to a content of an inquiry packet that the monitoring control circuit section 30a has transmitted.

In the above-mentioned non-volatile data memory 46, there are preliminarily stored data of correct answer information to be used by the error discrimination means 45, or an inquiry packet, a normal confirmation packet or a non-normal confirmation packet that the monitoring control circuit section 30a transmits.

The above-mentioned process counter 47 performs the up-count every time the monitoring control circuit section 30a transmits an inquiry packet. Accordingly, numbers 1–16 of an inquiry packet to be transmitted are sequentially updated in accordance with current values 1–16 of the foregoing process counter.

The above-mentioned error counter 48 is to perform e.g., the down-count of one count when the receiving-confirmation means 42 discriminates a normal receiving, and to perform e.g., the up-count of three counts when a determination result of the error discrimination means 45 is abnormal. Further the above-mentioned error counter 48 is to reset the microprocessor 20a to start it again when a current value of the error counter 48 is, for example, not less than 13.

A current value of the above-mentioned error counter 48 is to be transferred to the transmit-receive buffer memory 41 as a part of data in an inquiry packet, and transmitted to the microprocessor 20a.

The above-mentioned data processing circuit 40 includes checksum operation means, not shown, and adds a checksum data to transmission data having been stored in the transmit-receive buffer memory 41 to transmit resultant data to the microprocessor 20a.

In addition, RST1 is a reset pulse signal of the monitoring control circuit section 30a by the microprocessor 20a, and RST2 is a reset pulse signal of the microprocessor 20a by the monitoring control circuit section 30a. It is arranged such that a current value of the process counter 47 becomes 1 responsive to a reset pulse signal RST1 and a current value of the error counter 48 becomes 11.

Figure 2:
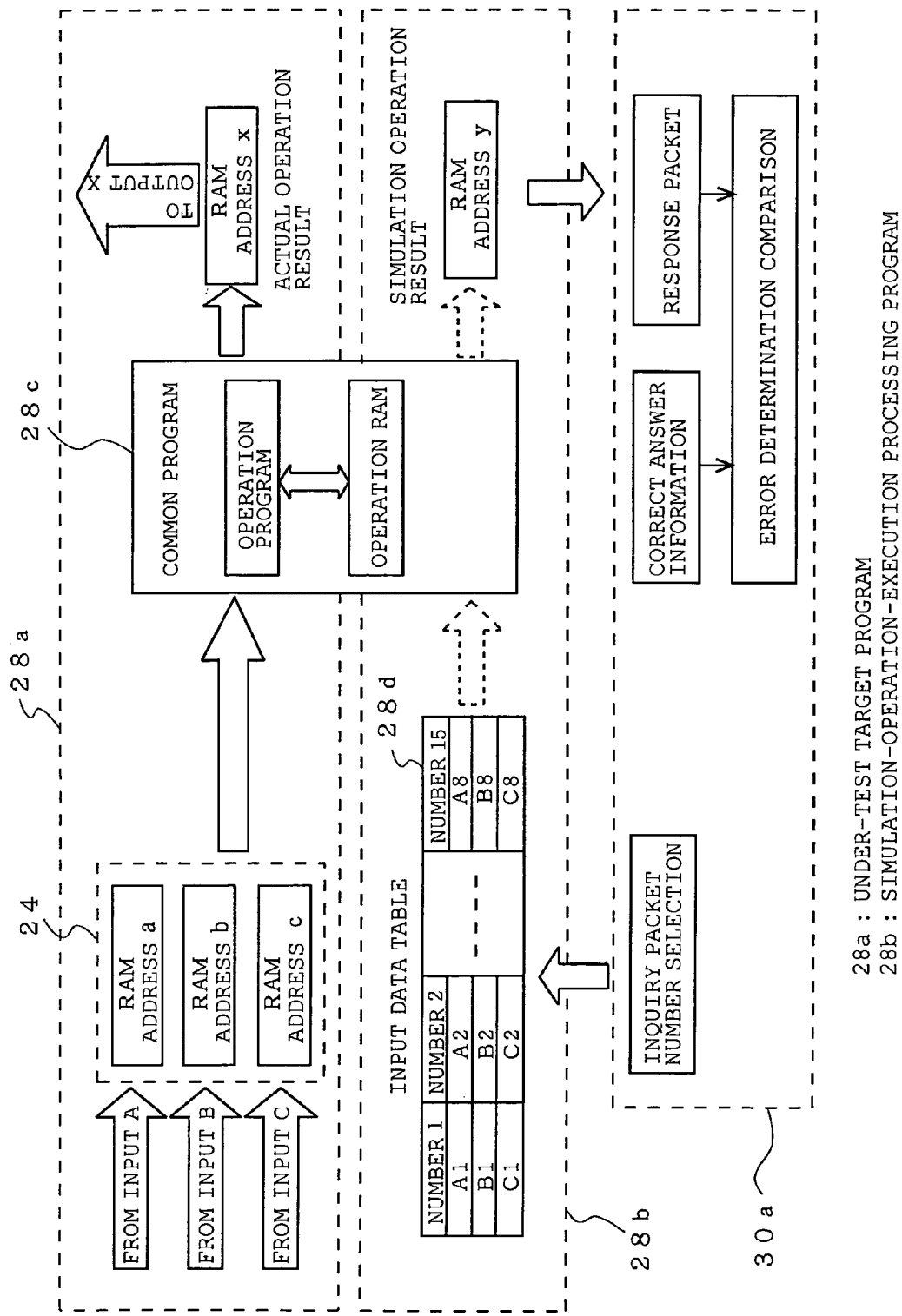
FIG. 2 is a partially equivalent control block diagram of FIG. 1.

FIG. 2 is a partially equivalent control block diagram of FIG. 1. FIG. 2 shows an example of a control block to be executed by an under-test target program 28a, being a part of programs in the above-mentioned control program 26a. In this example, for example, contents of an input A, input B and input C, which are a part of analog inputs in the input sensor group 11, are stored in an address a, address b and address c within the RAM memory 24. In addition, when the inputs A, B and C are in coincidence within a relative error of 5% by an operation program in a common program 28c, a mean value of A, B, and C are to be outputted to the outside via a RAM memory of an address X. Further, the above-mentioned operation program is executed such that when an error of any one of the inputs A, B and C is large, a mean value of the remaining two inputs with the exception of this input; and when a relative error of all the inputs is large, an input value showing the minimum is to be output to outside as it is. In these operation processes, the RAM memory 24 is used for the operation processing.

In addition, FIG. 2 shows a control block that a simulation-operation-execution processing program 28b corresponding to the under-test target program 28b executes. An input data table 28d is to be applied to the simulation operation control block, an input data group, which is indicated by the numbers 1 to 15, are selected in accordance with a content of an inquiry packet having been transmitted from the monitoring control circuit section 30a. The common program 28c is to be used in common between the above-mentioned under-test target program 28a and the simulation-operation-execution processing program 28b. An execution result of a simulation operation according to the common program 28c is transmitted to the monitoring control circuit section 30a with a response packet via a RAM memory of address Y.

Accordingly, when the inquiry packet specifies the number 1, and e.g., A1=101, A2=102, A3=103 are stored, as an operation result according to the common program 28c, 102 being a mean value of the whole is a correct answer. When an inquiry packet specifies the number 2, and e.g., A1=110, A2=112, A3=120 are stored, as an operation result according to the common program 28c, 111 being a mean value of A1 and A2 is a correct answer. Further, when an inquiry packet specifies the number 3, and e.g., A1=10, A2=20, A3=30 are stored, as an operation result according to the common program 28c, 10 being the minimum value is a correct answer.

The microprocessor 20a executes alternately the under-test target program 28a and the simulation-operation-execution processing program 28b. However, the number of an input data group to be processed by the simulation-operation-execution processing program 28b is to be updated in sequence in accordance with a content of an inquiry packet that is sequentially transmitted from the monitoring control circuit section 30a. The microprocessor 20a transmits an operation result according to the simulation-operation-execution processing program 28b to the monitoring control circuit section 30a based on a response packet. The monitoring control circuit section 30a compares a correct answer information having preliminarily been stored in the non-volatile data memory 46 acting as correct answer information storage means with an answer content from the microprocessor 20a, thereby carrying out an error discrimination of the common program 28c.

Figure 3:
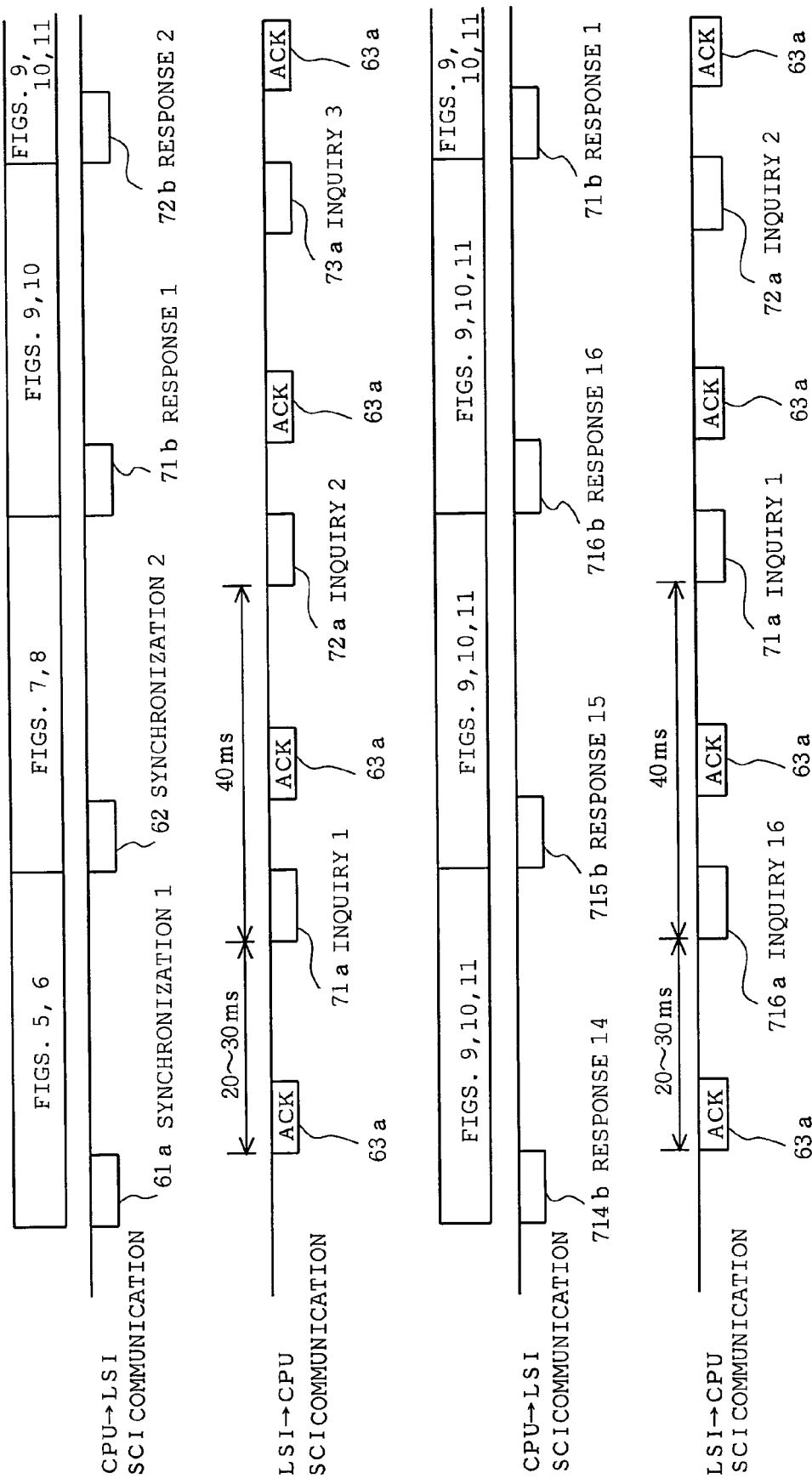
FIG. 3 is a time chart of a serial communication of FIG. 1.
Figure 4:
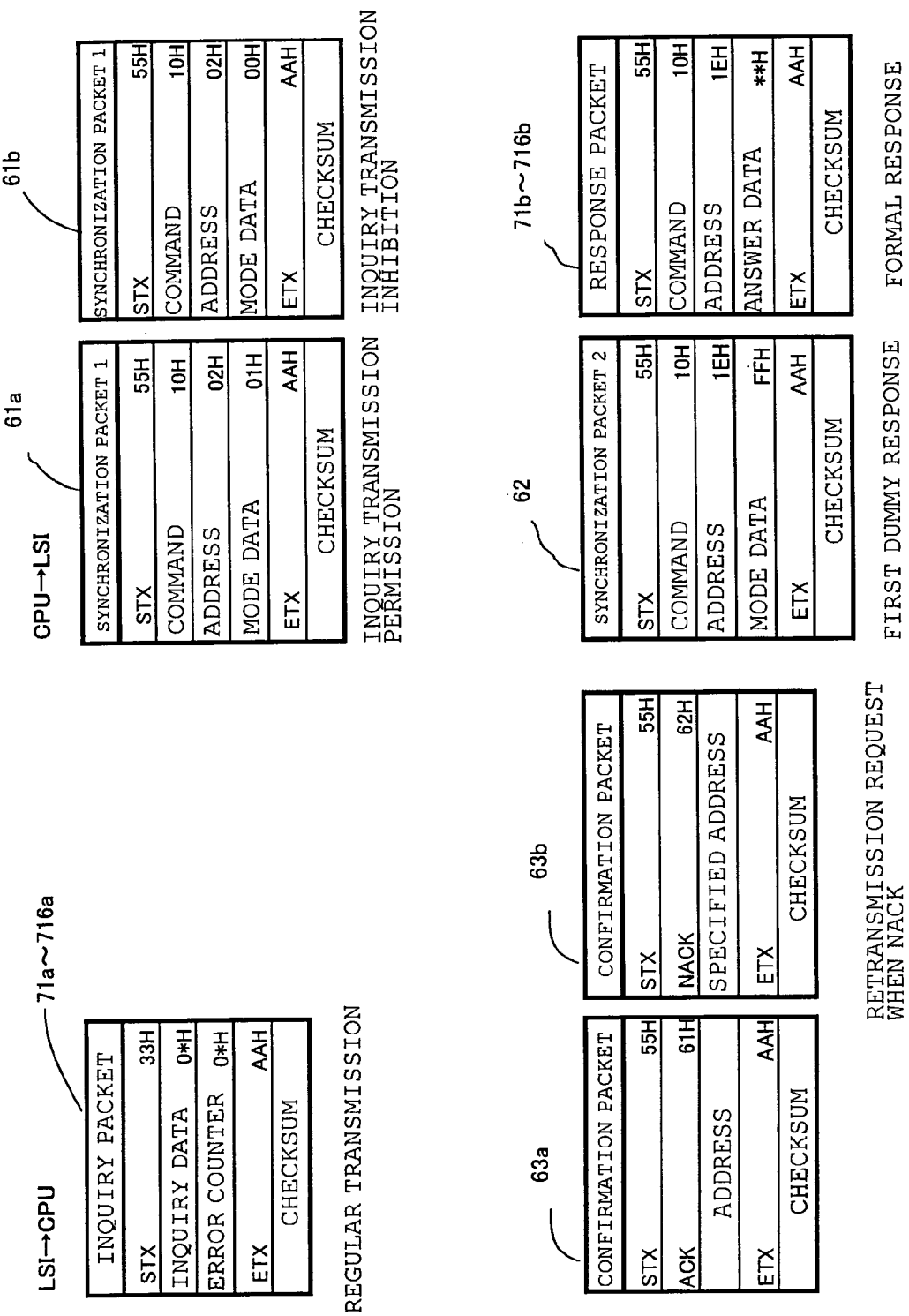
FIG. 4 is a block diagram of a packet of a serial communication of FIG. 1.

FIG. 3 is a time chart of a serial communication of FIG. 1. FIG. 4 is a block diagram showing packets of the serial communication of FIG. 1. Hereinafter, descriptions of FIG. 3 are made referring to FIG. 4. In FIG. 3, a time chart indicated by CPU→LSI shows a timing of transmission data from the microprocessor 20a to the monitoring control circuit section 30a. A time chart indicated by LSI→CPU shows a timing of transmission data from the monitoring control circuit section 30a to the microprocessor 20a. A first synchronization packet 61a that the microprocessor 20a transmits, as shown in FIG. 4, consists of a total of six data frames comprising five frames of data, specifically start declaration data STX=55H (H means hexadecimal, and so forth), command data=10H, address data=02H, a mode data 01H and end declaration data ETX=AAH, and checksum data, being a correction value with respect to a binary addition value of each data.

Furthermore, serial data to be transmitted and received between a pair of serial interface circuits 29 and 49 consist of a total of 11 bits of data per one frame comprising 8 bits of net data, and a start bit, a stop bit and a parity bit that are added at a serial-parallel converter on the transmission side. A parity check is carried out on the receiving side. In case of the presence of error, a received data is discarded. In case of absence of error, however, only 8 bits of net data are extracted, and each frame is to be sequentially stored respectively in a buffer memory, not shown.

When mode data of the above-mentioned first synchronization packet 61a are 01H, this indicates a content that permits the monitoring control circuit section 30a to regularly transmit an inquiry packet. As indicated by numeral 61b in FIG. 4, 00H of mode data of the first synchronization packet means inhibition of transmitting an inquiry packet.

Numeral 63a in FIG. 3 designates a normal confirmation packet that the monitoring control circuit section 30a having received the first synchronization packet 61a replies. The normal confirmation packet 63a, as shown in FIG. 4, consists of a total of five data frames including 4 frames of data, that is, start declaration data STX=55H, normal confirmation data ACK=61h, address data=02H (the same as the address of the first synchronization packet 61a) and end declaration data ETX=AAH, and checksum data being a correction value with respect to a binary addition value of respective data.

On the supposition that any sum check error is present in the first synchronization packet 61a having been received, a non-normal confirmation packet 63b, shown in FIG. 4, is replied instead of the above-mentioned normal confirmation packet 63a. The non-normal confirmation packet 63b is different from the above-mentioned normal confirmation packet 63a in the aspect that a non-normal confirmation data NACK=62H. Further, a confirmation packet is a confirmation response to a synchronization packet or a response packet. The NACK stands for the request for retransmission.

A first inquiry packet 71a is transmitted to the microprocessor 20a after a predetermined time period has passed since the reply of a normal confirmation packet 63a by the monitoring control circuit section 30a. The inquiry packet 71a, as shown in FIG. 4, consists of a total of five data frames including 4 frames of data, that is, start declaration data STX=33H, inquiry data=0*H, current value of the error counter=0*H and end declaration data ETX=AAH, and checksum data being a correction value with respect to a binary addition value of respective data. In addition, inquiry data of the first inquiry packet 17a are 00H. There are 16 types of inquiry data, in sequence of 01H, 02H . . . 0FH. Furthermore, since a current value of the error counter 48 is up to 13, it can be processed with a numeric value in single figure in hexadecimal.

With reference to FIG. 3, a second synchronization packet 62 is transmitted by the microprocessor 20a having received an inquiry packet 71a. The second synchronization packet 62 is as shown in FIG. 4. As compared with the first synchronization packet 61a, address becomes from 02H to 1EH and mode data become from 01H to FFH. Further, the second synchronization packet 62 is to notify the monitoring control circuit section 30a of having normally received the first inquiry packet 71a. Numeral 63a designates a normal confirmation packet of the fact that the monitoring control circuit section 30a has normally received the second synchronization packet 62. A second inquiry packet 72a is transmitted after a predetermined time period has passed since the transmission of the inquiry packet 71a. Numeral 71b designates the first response packet that the microprocessor 20a having normally received the inquiry packet 72a replies. In addition, an inquiry packet is not retransmitted, and is to be regularly transmitted.

The response packet 71b is constituted as shown in FIG. 4, and consists of a total of six data frames including five frames of data, specifically start declaration data STX=55H, command data=10H, address data=1EH, answer data=H and end declaration data ETX=AAH, and checksum data being a correction value with respect to a binary addition value of respective data. Further, a content of the above-mentioned answer data H is answer information to a questionnaire that are specified by the inquiry packet 71a.

Hereinafter, likewise inquiry packets 72a, 73a . . . are sequentially transmitted at regular intervals; and response packets 72b, 73b . . . that are responsive to these inquiry packets, are replied, being delayed by one timing. A response packet 716b when an inquiry packet comes to be numeral 71a again contains answer data to the last inquiry packet 716a.

On the other hand, on the side of receiving various packets, a binary addition of all the frames having been received (containing the checksum data) is carried out. In the case where a result thereof becomes 0, a sum check is determined to be normal; and in the case of not being 0, a sum check is determined to be abnormal.

Detailed Description of Action and Operation of Embodiment 1

Figure 5:
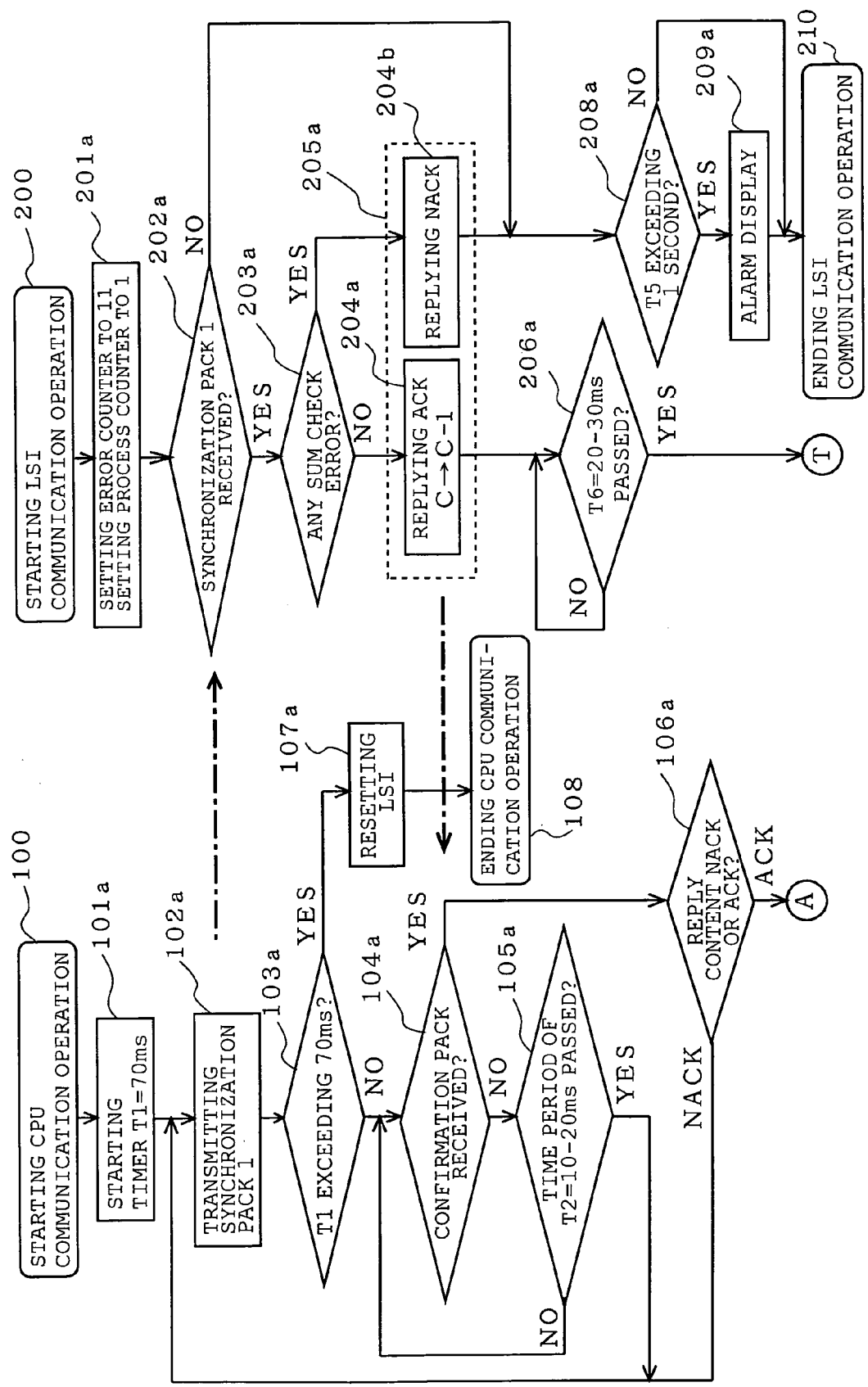
FIG. 5 is a partial flowchart for explaining a CPU operation of FIG. 1.
Figure 6:
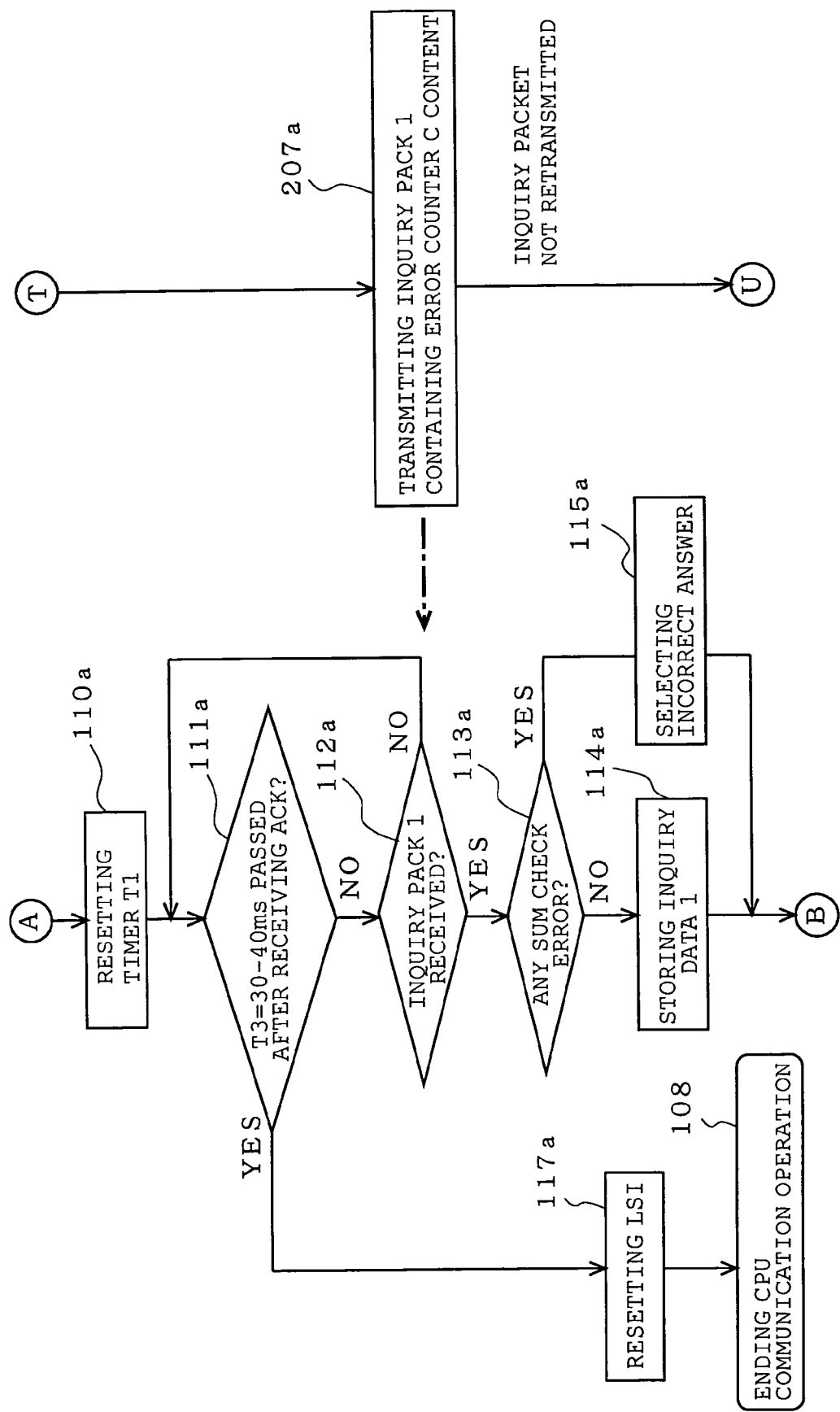
FIG. 6 is a partial flowchart for explaining a CPU operation of FIG. 1.

In the electronic control unit according to the first embodiment of this invention constituted as shown in FIG. 1, flowcharts explaining a communication operation, shown in FIGS. 5 to 11, are described. Further, FIGS. 5 to 11 are connected via relay codes A–F, T–Z to form a complete flow. Operations from transmitting the first synchronization packet 61a to receiving the inquiry packet 71a, shown in FIG. 3, are shown in FIGS. 5 and 6. With reference to FIGS. 5 and 6, numeral 100 is a communication operation start step of the microprocessor 20a to be regularly activated. Numeral 101a is a step that acts subsequently to Step 100, and activates a timer T1 the Time's Up time period of which is, for example, about 70 ms. Numeral 102a is a step that acts subsequent to Step 101a, and transmits a first synchronization packet 61a, shown in FIGS. 3 and 4 (first synchronization packet transmission means). Numeral 103a is a step that acts subsequently to Step 102a, and determines whether or not the timer having been activated in Step 101a is Time's Up.

Numeral 104a is a step that acts when Step 103a makes no determination of Time's Up, and determines whether or not a confirmation packet, which the monitoring control circuit section 30a has transmitted in Step 205a to be described later, is received. Numeral 105a is a step that acts when Step 104a determines that a confirmation packet has not been received yet, and waits for a time period of, e.g., 10–20 ms as a standby time T2. The program returns to the above-mentioned Step 104a, in which the operation continues to wait for a confirmation packet to be received until this standby time period has passed. In addition, after the standby time period has passed, the program returns to Step 102a, which acts again as retransmission means for transmitting the first synchronization packet 61a.

Numeral 106a is a step that acts when Step 104a determines that a confirmation packet has been received, and discriminates whether a received content thereof is a normal confirmation packet 63a (ACK) or a non-normal confirmation packet 63b (NACK), shown in FIG. 4. When Step 106a discriminates the non-normal receiving (NACK), the program returns to Step 102a, which acts again as retransmission processing means for transmitting the first synchronization packet 61a.

Numeral 107a is a process that repeatedly executes Steps 102a, 103a, 104a, 105a or 106a, and a step that acts when Step 103a determines that the timer T1 is Time's Up, and causes the operation of the monitoring control circuit section 30a to return to an initial step 200. Numeral 108 is an operation end step that acts subsequently to Step 107a. The microprocessor 20a stands by for the operation in the above-mentioned operation end step 108, carries out the other controls, and thereafter the program of the microprocessor 20a returns again to the above-mentioned operation start step 100.

Numeral 110a (FIG. 6) is a step that acts when the above-mentioned Step 106a discriminates the normal receiving (ACK), and stops the timer T1 having been activated in Step 101a to reset a current value of the timer. Numeral 111a is a step that determines whether or not a standby time period T3, for example, 30–40 ms has passed since the discrimination of the normal receiving (ACK) in the above-mentioned Step 106a. Numeral 112a is a step that acts when the above-mentioned Step 111a determines that a standby time period T3 has not passed yet, and determines whether or not the microprocessor 20a receives an inquiry packet 71a (refer to FIGS. 3 and 4) having been transmitted from the monitoring control circuit section 30a in Step 207a to be described later. In the case where the inquiry packet 71a has not been received yet in Step 112a, the program returns to the above-mentioned Step 111a, which acts to wait for the inquiry packet 71a to be received.

Numeral 113a is a step that acts when the above-mentioned Step 112a determines that the inquiry packet 71a has been received, and carries out a sum check of the inquiry packet 71a having been received to determine presence or absence of any error. Numeral 114a is a step that acts when Step 113a determines the absence of error, and stores inquiry data in the inquiry packet 71a. Numeral 115a is a step that acts when the above-mentioned Step 113a determines the presence of error, and stores information for intentionally making a content of a response packet in the later-described Step 102c (refer to FIG. 9) an incorrect answer. The foregoing Step 115a serves as incorrect answer transmission determination means.

Numeral 117a is a step that acts when the above-mentioned Step 111a determines that a standby time period has passed as well as the inquiry packet 71a cannot be received during this standby time period, and causes the operation of the monitoring control circuit section 30a to return to the initial step 200. The program proceeds to an operation end step 108 subsequent to the foregoing Step 117a, and goes again to the operation start step 100 after passing a predetermined time period.

Numeral 200 is an operation start step relative to a flowchart showing contents of an operation equivalent to a control operation of the monitoring control circuit section 30a. Numeral 210a is a reset step that acts subsequently to Step 200, and initializes a current value of the error counter 48, shown in FIG. 1, to be 11, as well as initializes a current value of the process counter 47 to be 1. Numeral 202a is a step that determines whether or not the first synchronization packet 61a having been transmitted in the above-mentioned Step 102a is received. Numeral 203a is a step that acts when Step 202a determines that the first synchronization packet 61a has been received, and carries out a sum check operation to determine presence of absence of any error. This Step 203a serves as receiving-confirmation means.

Numeral 204a is a step that acts when the above-mentioned Step 203a determines absence of any error, and replies the normal receiving (ACK) data indicated by the confirmation packet 63a of FIG. 4, as well as causes a current value of the error counter 48 to decrease by one. Numeral 204b is a step that acts when the above-mentioned Step 203a determines presence of any error, and replies the non-normal receiving (NACK) data indicated by the confirmation packet 63b of FIG. 4. Numeral 205a is a step block consisting of the above-mentioned Steps 204a and 204b, and the forgoing Step 205a acts as receiving-confirmation-response means.

Numeral 206a acts subsequently to the above-mentioned Step 204a, and is a determination step of the elapse of a standby time period that stands by while carrying out a circulating operation until a standby time period T6 exceeds, for example, 20–30 ms. Numeral 207a is a step that acts when the foregoing Step 206a determines the elapse of a standby time period, and transmits the first inquiry packet 71a (inquiry packet transmission means), shown in FIGS. 3 and 4. Current value data of the above-mentioned error counter 48 are contained in the inquiry packet 71a.

Numeral 208a is a step that acts when the above-mentioned Step 202a determines that the first synchronization packet 61a has not been received, or subsequently to the above-mentioned Step 204b in the case of the non-normal receiving (NACK) even if the first synchronization packet 61a has been received, and determines whether or not a standby time period T5 exceeds, for example, one second. Numeral 209a is a step that acts when Step 208a determines that a standby time period has passed, and brings the alarm display 14 of FIG. 1 into operation (monitoring permission error processing means). Numeral 210 is an operation end step that acts when the above-mentioned Step 208a determines that a standby time period has not passed yet, or subsequently to the above-mentioned Step 209a. In this operation end step 210, the monitoring control circuit section 30a carries out the other control operations, and thereafter the program of the monitoring control circuit section 30a goes to the operation start step 200 again. Accordingly, the program waits for the first synchronization packet 61a to be transmitted while circulating between Steps 200, 201a, 202a, 208a, and 210. After a standby time period T5 has passed, an alarm display is performed in Step 209a.

Figure 7:
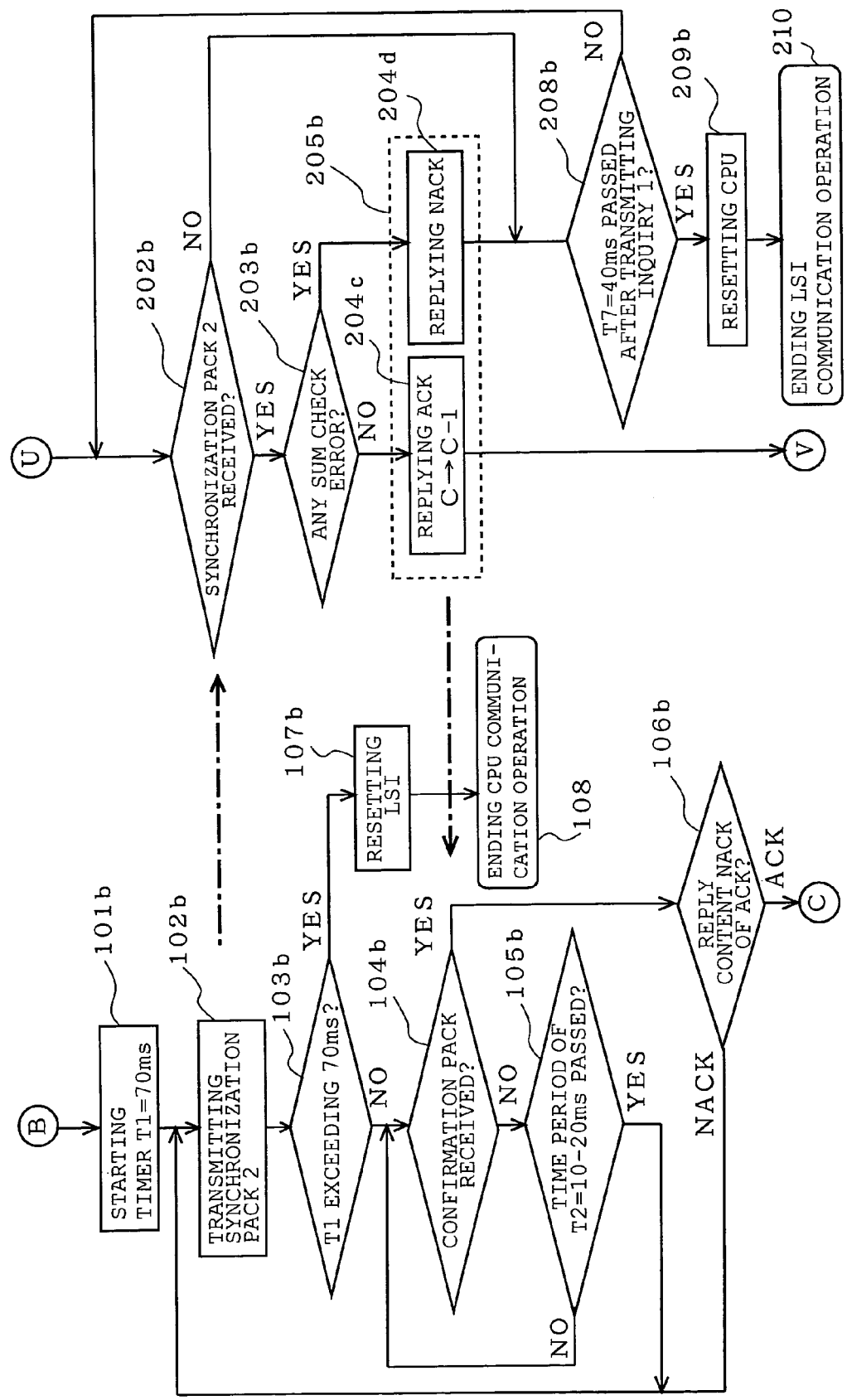
FIG. 7 is a partial flowchart for explaining a CPU operation of FIG. 1.
Figure 8:
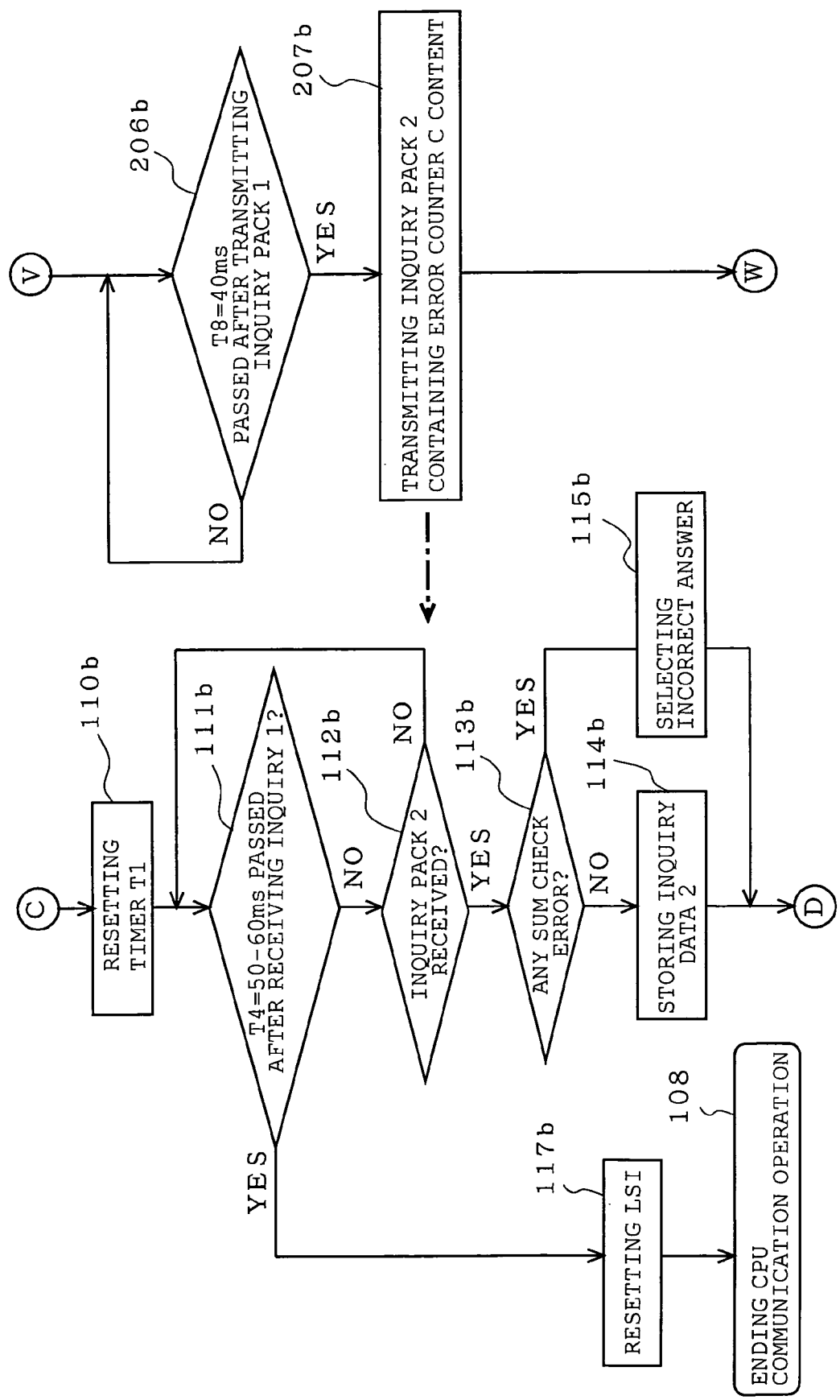
FIG. 8 is a partial flowchart for explaining a CPU operation of FIG. 1.

Operations from transmitting the second synchronization packet 62 to receiving the inquiry packet 72a, shown in FIG. 3, are described with reference to FIGS. 7 and 8. In FIGS. 7 and 8, numeral 101b is a step that acts subsequently to the above-mentioned Step 114a or 115a, and activates a timer T1 the Time's Up time period of which is, for example, about 70 ms. Numeral 102b is a step that acts subsequently to Step 101b, and transmits the second synchronization packet 62, shown in FIGS. 3 and 4. Numeral 103b is a step that acts subsequently to Step 102b, and determines whether or not the timer T1 having been activated in Step 101b is Time's Up.

Numeral 104b is a step that acts when the above-mentioned Step 103b makes no Time's Up determination, and determines whether or not a confirmation packet, which the monitoring control circuit section 30a has transmitted in the later-described Step 205b, is received. Numeral 105b is a step that acts when Step 104b determines that a confirmation packet has not been received yet, and waits for a time period of, e.g., 10–20 ms as a standby time T2. Until this standby time period has passed, the program returns to Step 104b, which continues to wait for a confirmation packet to be received. In addition, when exceeding a standby time period, the program returns to Step 102b, which acts as retransmission processing means for transmitting the second synchronization packet 62 again.

Numeral 106b is a step that acts when the above-mentioned Step 104b determines that a confirmation packet has been received, and discriminates whether a received content thereof is the normal confirmation packet 63a (ACK) or the non-normal confirmation packet 63b (NACK), shown in FIG. 4. When Step 106b discriminates the non-normal receiving (NACK), the program returns to the above-mentioned Step 102b, which acts as retransmission processing means for transmitting the second synchronization packet 62 again.

Numeral 107b is a process of repeatedly executing the above-mentioned Steps 102b, 103b, 104b, 105b, or 106b. This Step 107b is a step that acts when the above-mentioned Step 103b determines that the timer T1 is Time's Up, and causes the operation of the monitoring control circuit section 30a to return to the initial step 200. Numeral 108 is an operation end step that acts subsequent to Step 107b. The microprocessor 20a stands by for the operation in the above-mentioned operation end step 108 to carry out the other controls, and thereafter the program of the microprocessor 20a returns again to the above-mentioned operation start step 100.

Numeral 110b is a step that acts when the above-mentioned Step 106b discriminates the normal receiving (ACK), and stops the timer T1 having been activated in the above-mentioned Step 101b to reset a current value of the timer. Numeral 111b is a step that determines whether or not, e.g., 50–60 ms has passed as a standby time period T4 from the determination of receiving the inquiry packet 71a in the above-mentioned Step 112a.

Numeral 112b is a step that acts when the above-mentioned Step 111b determines no elapse of the standby time period T4. This step 112b determines whether or not the microprocessor 20a receives the inquiry packet 72a (refer to FIGS. 3 and 4) having been transmitted from the monitoring control circuit section 30a in the later-described Step 207b. In the case where Step 112b determines that the inquiry packet 72a has not been received yet, the program returns to the above-mentioned Step 111b to wait for the inquiry packet 72b to be received.

Numeral 113b is a step that acts when the above-mentioned Step 112b determines the receiving, and carries out a sum check of the inquiry packet 72a having been received to determines presence or absence of any error. Numeral 114b is a step that acts when Step 113b determines the absence of error, and stores inquiry data in the inquiry packet 72a. Numeral 115b is a step that acts when the above-mentioned Step 113b determines the presence of error, and stores information for intentionally making a content of a response packet in the later-described Step 102c (refer to FIG. 9) an incorrect answer. The foregoing Step 115b acts as incorrect answer transmission determination means.

Numeral 117b is a step that acts when the above-mentioned Step 111b determines that a standby time period has passed, as well as the inquiry packet 72a cannot be received during this standby time period, and causes the operation of the monitoring control circuit section 30a to return to the initial step 200. Then the program proceeds to an operation end step 108 subsequently to the foregoing Step 117b, and goes to the operation start step 100 again after a predetermined time period has passed.

Numeral 202b is a step that acts subsequently to the above-mentioned Step 207a, and determines whether or not the second synchronization packet 62 having been transmitted in the above-mentioned Step 102b is received. Numeral 203b is a step that acts when the foregoing Step 202b determines the receiving of the packet, and carries out a sum check operation to determine presence or absence of any error (receiving-confirmation means).

Numeral 204c is a step that acts when the above-mentioned Step 203b determines the absence of error, and replies normal receiving (ACK) data, which is indicated by the confirmation packet 63a of FIG. 4, as well as causes a current value of the error counter 48 to decrease by one. Numeral 204d is a step that acts when the above-mentioned Step 203b determines the presence of error, and replies non-normal receiving (NACK) data indicated by the confirmation packet 63b of FIG. 4. Numeral 205b is a step block consisting of the above-mentioned Steps 204c and 204d, and this. Step block 205b acts as receiving-confirmation-response means.

Numeral 206b acts subsequently to the above-mentioned Step 204c, and is an elapse determination step of a standby time that stands by while carrying out a circulating operation until T8 that is a standby time period from the transmission of the inquiry packet 71a, for example, 40 ms has passed. Numeral 207b is a step that acts when the foregoing Step 206b determines that the standby time period has passed, and transmits the inquiry packet 72a, shown in FIGS. 3 and 4 (inquiry packet transmission means). A current value data of the above-mentioned error counter is contained in the inquiry packet 72a.

Numeral 208b is a step that acts when the above-mentioned Step 202b determines that the second synchronization packet 62 has not been received, or subsequently to the above-mentioned Step 204d in the case of the non-normal receiving (NACK) even if the second synchronization packet 62 is received. This step 208b determines whether or not T7, which is a standby time period from the transmission of the inquiry packet 71a, for example, 40 ms, has passed. When the standby time period has not passed yet, the program returns to the above-mentioned Step 202b, which acts again to determine whether or not the second synchronization packet 62 is received.

Numeral 209b is a step that acts when the above-mentioned Step 208b determines that the standby time period has passed, and resets the microprocessor 20a with a reset pulse signal RST2 of FIG. 1 to restart it. Numeral 210 is an operation end step that acts subsequently to the above-mentioned Step 209b. The monitoring control circuit section 30a carries out the other control operations in the foregoing operation end Step 210, and thereafter the program is to go to the operation start Step 200 again.

Figure 9:
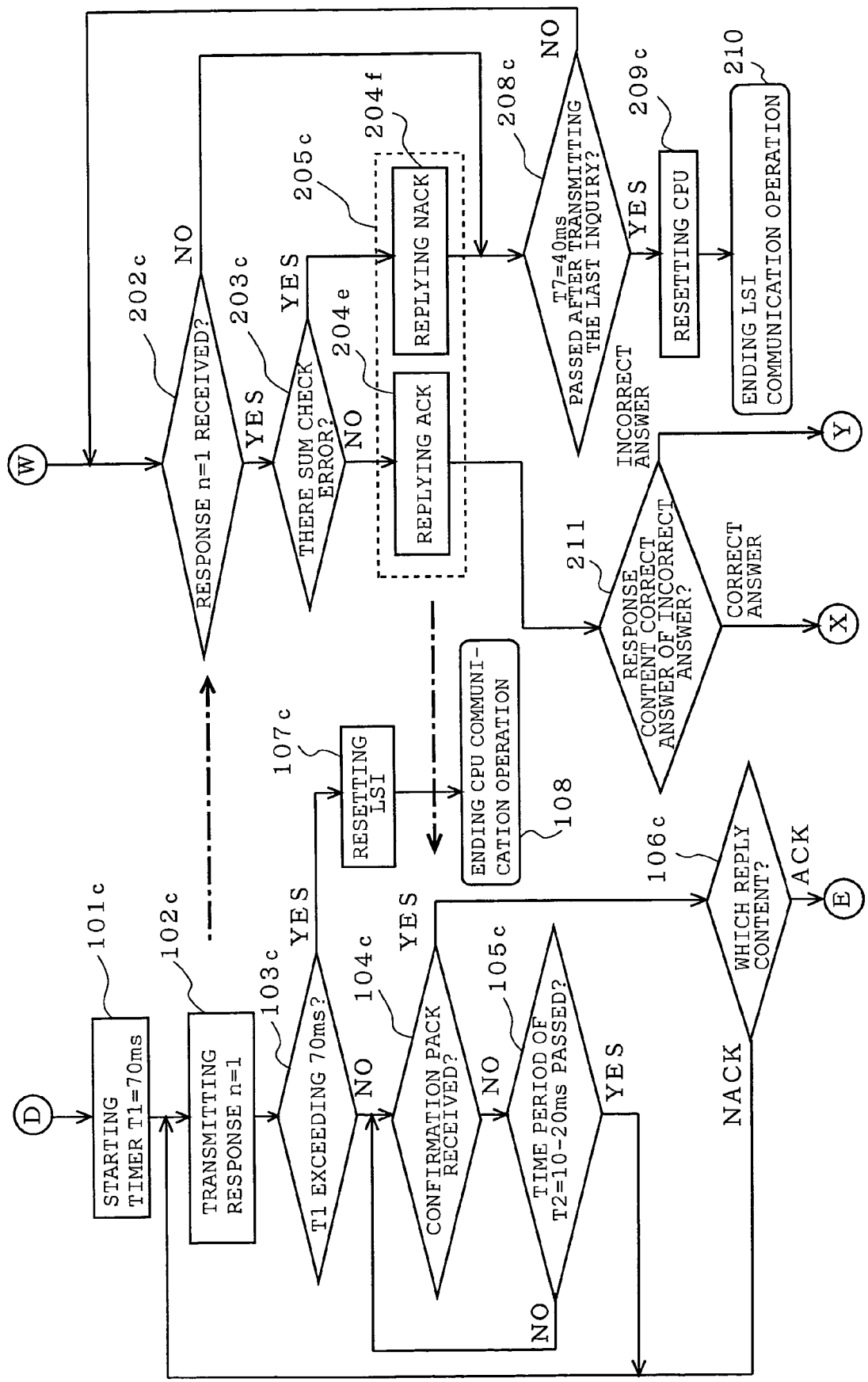
FIG. 9 is a partial flowchart for explaining a CPU operation of FIG. 1.
Figure 10:
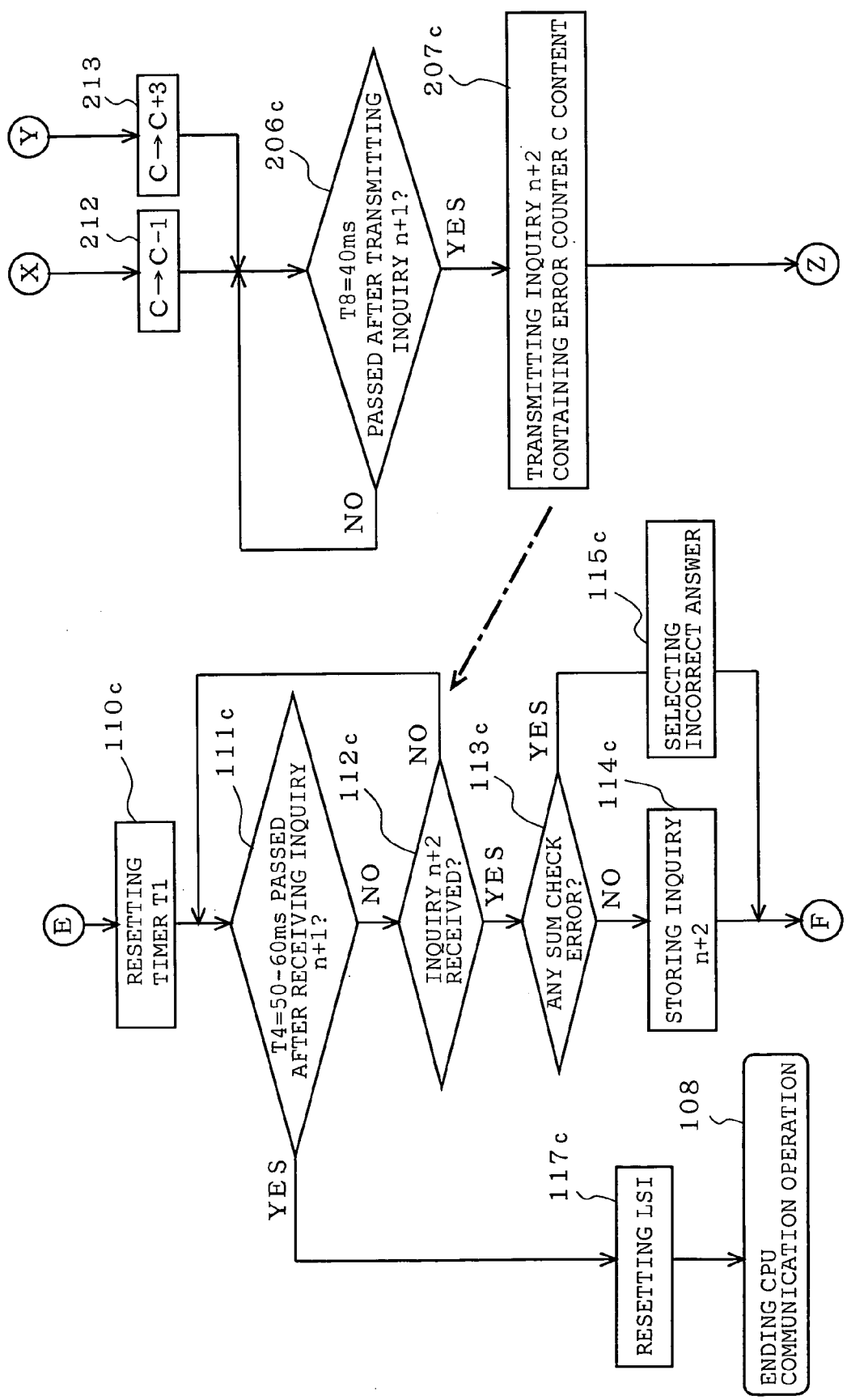
FIG. 10 is a partial flowchart for explaining a CPU operation of FIG. 1.

Operations from transmitting the response packet 71b to receiving the inquiry packet 73a, shown in FIG. 3, are now described with reference to FIGS. 9 and 10. In FIGS. 9 and 10, numeral 101c is a step that acts subsequently to the above-mentioned Step 114b or 115b, and activates a timer T1 the Time's Up time period of which is, for example, about 70 ms. Numeral 102c is a step that act subsequently to Step 101c, and transmits the response packet 71b, shown in FIGS. 3 and 4 (response packet transmission means). Numeral 103c is a step that acts subsequently to Step 102c, and determines whether or not the timer T1 having been activated in the above-mentioned Step 101c is Time's Up.

Numeral 104c is a step that acts when the above-mentioned Step 103c makes no Time's Up determination, and determines whether or not a confirmation packet, which the monitoring control circuit section 30a has transmitted in the later-described Step 205c, has been received. Numeral 105c is a step that acts when Step 104c determines that a confirmation packet has not been received yet, and waits for a time period of, e.g., 10–20 ms as a standby time T2. Until this standby time period has passed, the program returns to Step 104c, which continues to wait for a confirmation packet to be received. In addition, when the standby time period has passed, the program returns to the above-mentioned Step 102c, which acts again as retransmission processing means for transmitting the response packet 71b.

Numeral 106c is a step that acts when the above-mentioned Step 104c determines that a confirmation packet has been received, and discriminates whether a received content thereof is the normal confirmation packet 63a (ACK) or the non-normal confirmation packet 63b (NACK), shown in FIG. 4. When Step 106c discriminates the non-normal receiving (NACK), the program returns to Step 102c, which acts again as retransmission processing means for transmitting the response packet 71b.

Numeral 107c is a process of repeatedly executing the above-mentioned Steps 102c, 103c, 104c 105c, or 106c. This Step 107c is a step that acts when the above-mentioned Step 103c determines that the timer T1 is Time's Up, and causes the operation of the monitoring control circuit 30a to return to the initial step 200 (confirmation reply error processing means). Numeral 108 is an operation end step that acts subsequently to Step 107c. The microprocessor 20a stands by for the operation in the above-mentioned operation end step 108 to carry out the other controls, and thereafter the program of the microprocessor 20a returns again to the above-mentioned operation start step 100.

Numeral 110c is a step that acts when the above-mentioned Step 106c discriminates the normal receiving (ACK), and stops the timer T1 having been activated in the above-mentioned Step 110c to reset a current value of the timer. Numeral 111c is a step that determines whether or not, e.g., 50–60 ms has passed as a standby time period T4 from the determination of receiving the inquiry packet 72a in the above-mentioned Step 112a.

Numeral 112c is a step that acts when the above-mentioned Step 111c determines that the standby time period T4 has not passed yet. This Step 112c determines whether or not the microprocessor 20a has received the inquiry packet 73a (refer to FIGS. 3 and 4) having been transmitted from the monitoring control circuit section 30a in Step 207c to be described later. In the case where Step 112c determines no receiving, the program returns to the above-mentioned Step 111c to wait for the inquiry packet 73a to be received.

Numeral 113c is a step that acts when the above-mentioned Step 112c determines the receiving, and carries out a sum check of the inquiry packet 73a having been received to determine presence or absence of any error. Numeral 114c is a step that acts when Step 113c determines the absence of error, and stores an inquiry data in the inquiry packet 73a. Numeral 115c is a step that acts when the above-mentioned Step 113c determines the presence of error, and stores information for intentionally making a content of a response packet at the time when the above-mentioned Step 102c is circulated and executed again, an incorrect answer. The foregoing Step 115c acts as incorrect answer transmission determination means.

In addition, describing the incorrect answer selection proceeding in Step 115c, for example, with reference to the time chart of FIG. 3, when any sum check error is detected when the microprocessor 20a has received the inquiry packet 73a, an answer is replied with respect to the previous inquiry packet 72a in the response packet 72b. In the subsequent response packet 73b, however, a positional incorrect answer will be replied.

Numeral 117c is a step that acts when the above-mentioned Step 111c determines that a standby time period has passed, and the inquiry packet 73a cannot be received during this standby time period, and causes the operation of the monitoring control circuit section 30a to return to the initial step 200 (receiving interval error processing means). The program proceeds to an operation end step 108 subsequently to the foregoing Step 117c, and goes again to the operation start step 100 after a predetermined time period has passed.

Numeral 202c is a step that acts subsequently to the above-mentioned step 207b, and determines whether or not the response packet 71b having been transmitted in the above-mentioned Step 102c is received. Numeral 203c is a step that acts when Step 202c determines that the response packet 71b has been received, and carries out a sum check operation to determine presence or absence of any error (receiving-confirmation means). Numeral 204e is a step that acts when the above-mentioned Step 203c determines the absence of error, and replies normal receiving (ACK) data, indicated by the confirmation packet 63a of FIG. 4. Numeral 204f is a step that acts when the above-mentioned Step 203c determines the presence of error, and replies non-normal receiving (NACK) data, indicated by the confirmation packet 63b of FIG. 4. Numeral 205c is a step block consisting of the above-mentioned Steps 204e and 204f, and this step block 205c acts as receiving-confirmation-response means.

Numeral 211 is a step that acts subsequently to the above-mentioned Step 204e, and discriminates whether an answer data in the response packet 71b having been received is a correct answer or an incorrect answer as an answer to a question with inquiry data in the inquiry packet 71a. Correct answer information to be used in the foregoing Step 211 has been preliminarily stored in the non-volatile data memory 46 in FIG. 1. Numeral 212 is a step that acts when the above-mentioned Step 211 discriminates that it is the correct answer, and causes a current value of the error counter 48 in FIG. 1 to decrease only by one count. Numeral 213 is a step that acts when the above-mentioned Step 211 discriminates that it is the incorrect answer, and causes a current value of the error counter 48 in FIG. 1 to increase only by three counts.

Numeral 206c acts subsequently to the above-mentioned Step 212 or Step 213. This Step 206c is an elapse determination step of a standby time that stands by while carrying out a circulating operation until T8, which is a standby time period from the transmission of the inquiry packet 72a, for example, 40 ms, has passed. Numeral 207c is a step that acts when the foregoing Step 206c determines that the standby time period has passed, and transmits the inquiry packet 73a shown in FIGS. 3 and 4 (inquiry packet transmission means). Current value data of the above-mentioned error counter 48 are contained in the inquiry packet 73a.

Numeral 208c is a step that acts when the above-mentioned Step 202c determines that the response packet 71b has not been received, or subsequently to the above-mentioned Step 204f in the case of the non-normal receiving (NACK) even if the response packet 71b has been received. This Step 208c determines whether or not T7, which is a standby time period from the transmission of the inquiry packet 71a, for example, 40 ms, has passed. When the standby time period has not passed yet, the program returns to the above-mentioned Step 202c, which carries out again the determination of whether or not the response packet 71b is received. Numeral 209c is a step that acts when the above-mentioned Step 208c determines that the standby time period has passed, and resets the microprocessor 20a with a reset pulse signal RST2 of FIG. 1 to restart it (response interval error processing means). Numeral 210 is an operation end step that acts subsequently to the above-mentioned Step 209c. The monitoring control circuit section 30a carries out the other control operations in the foregoing operation end step 210, and thereafter the program goes again to the operation start step 200.

Figure 11:
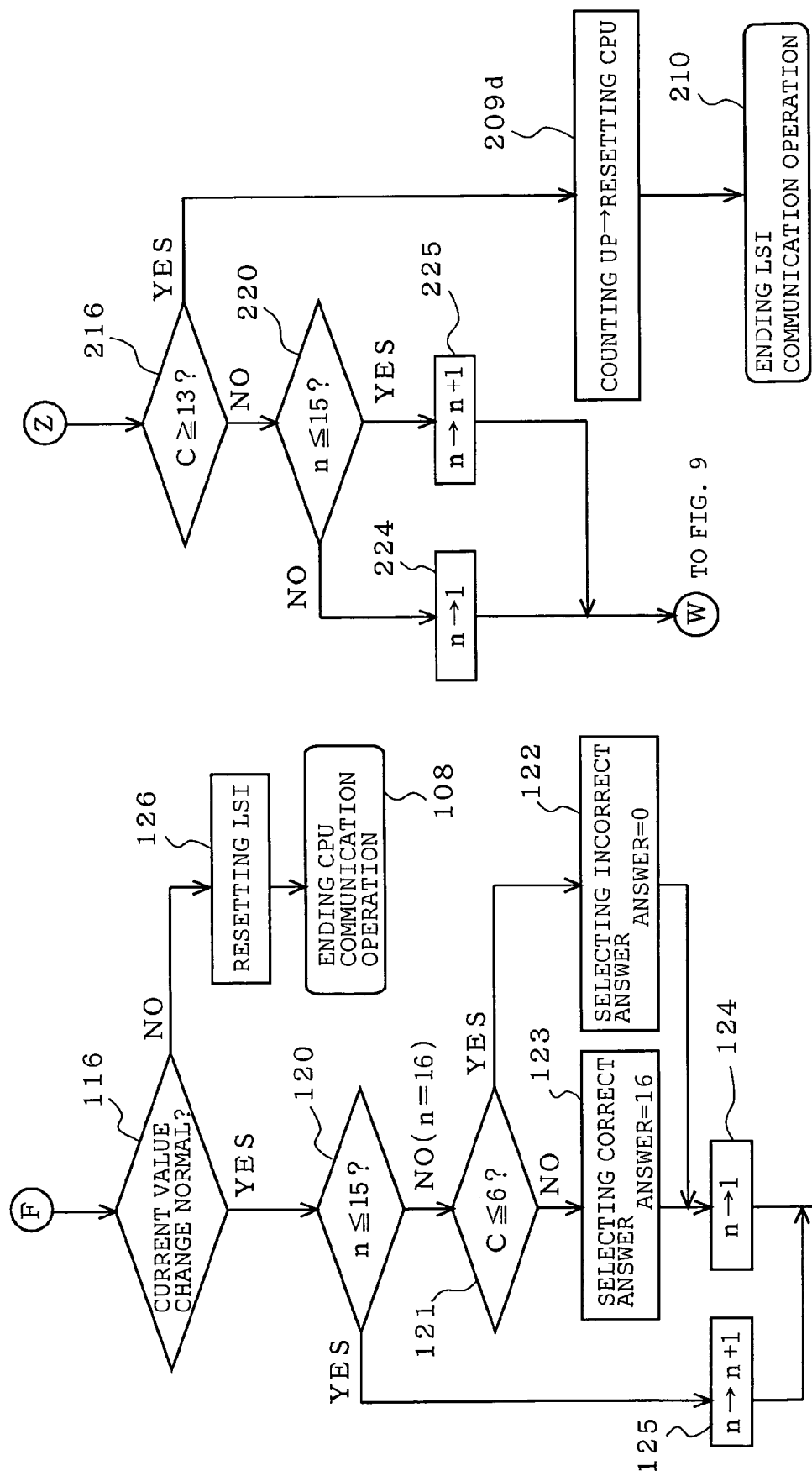
FIG. 11 is a partial flowchart for explaining a CPU operation of FIG. 1, and FIGS. 5 to 11 represent an overall flowchart for explaining a CPU operation.

A circulating operation since transmitting the response packet 72b in FIG. 3 is shown in FIG. 11. With reference to FIG. 11, Numeral 116 is a step that acts subsequently to the above-mentioned Step 114c or 115c. This Step 116 discriminates whether or not any change in current value of the error counter 48 that is contained in the latest inquiry packet having been received, is normal (current value monitoring means). The normal change herein is to determine whether or not a current value of the error counter 48 is increased by three counts as a processing result of the monitoring control circuit section 30a in the case where the microprocessor 20a intentionally carries out the incorrect answer selection in the above-mentioned Steps 115a, 115b, 115c or the later-described Step 122 and transmits predetermined incorrect answer data with the subsequent response packet. Numeral 120 is a step that acts when the above-mentioned Step 116 discriminates that it is normal, and determines whether or not a circulation number n (n=1 to 16) is not more than 15. A flow from the above-mentioned Steps 102c through 112c is the flow from transmitting a response packet of number n=1 to receiving an inquiry packet of number n+2=3.

Numeral 121 is a step that acts when the determination of the above-mentioned Step 120 exceeds 15, that is n=16, and determines whether or not a current value of the error counter 48, which is contained in the latest inquiry packet, is, for example, not more than 6. Numeral 122 is a step that acts when the determination of the foregoing Step 121 is not more than 6, and selects to intentionally reply a predetermined incorrect answer (for example, reply 0) in the next response packet (incorrect answer transmission selection means). Numeral 123 is a step that acts when the determination of the above-mentioned Step 121 exceeds 6, and selects to reply, for example, 16 as correct answer data in the next response packet. The above-mentioned Step 121 is provided in order to prevent a Count Up output from being generated in the later-described Step 216 as a result of the intentional transmission of an incorrect answer. It is preferable that a current value of the error counter 48 is set to not more than 9 as a margin limit.

Numeral 124 is a step that acts subsequently to the above-mentioned Step 122 or Step 123, and causes a circulation number to circulate from n=16 to n=1. Numeral 125 is a step that acts when the above-mentioned Step 120 determines that a circulation number is not more than 15, and increases a circulation number n by one. The program returns to the above-mentioned Step 101c subsequently to the above-mentioned Step 124 or Step 125. Then the subsequent operation is to transmit the response packet 72b in Step 102c, and to determine whether or not the inquiry packet 74a is received in Step 112c.

Numeral 126 is a step that acts when the above-mentioned Step 116 determines the error of change in current value, and causes the operation of the monitoring control circuit section 30a to return to the initial step 200. Numeral 108 is an operation end step that acts subsequently to Step 126. The microprocessor 20a stands by for operation in the above-mentioned operation end step 108 to carry out the other controls, and thereafter the program returns to the above-mentioned operation start step 100 again.

Numeral 216 is a step that acts subsequently to the above-mentioned Step 207c, and determines whether or not a current value of the error counter 48 is not less than 13. Numeral 220 is a step that acts when Step 216 determines that it is less than 13, and reads out a current value of the process counter 47 to determine whether or not a circulation number n (n=1 to 16) is not more than 15. Numeral 224 is a step that acts when the above-mentioned Step 220 determines that the circulation number exceeds 15, and causes the current value of the process counter 47 to circulate from a circulation number n=16 to n=1. Numeral 225 is a step that acts when the above-mentioned Step 220 determines that the circulation number is not more than 15, and causes the process counter 47 to perform the up-count to increase the circulation number n by one. The program returns to the above-mentioned Step 202c subsequently to the above-mentioned Step 224 or Step 225. Then the subsequent operation is to determine whether or not the response packet 72b has been received in Step 202c, and to transmit the inquiry packet 74a in Step 207c.

Numeral 209d is a step that acts when a current value of the error counter 48 is determined to be not less than 13 in the above-mentioned Step 216, and causes the error counter 48 to count up and resets the microprocessor 20a with a reset pulse signal RST2 of FIG. 1 to restart it. Numeral 210 is an operation end step that acts subsequently to the above-mentioned Step 209d. The monitoring control circuit section 30a carries out the other control operations in the foregoing operation end step 210, and thereafter the program goes again to the operation start step 200.

The action and operation of the electronic control unit according to this first embodiment of the invention having been heretofore described is briefly described again. Referring to FIG. 1, the microprocessor 20a drives and controls the electrical load group 12 depending on operating conditions of the input sensor group 11 and contents of the control program 26a stored in the non-volatile program memory 25a. The microprocessor 20a is monitored of run-away thereof by means of the watchdog timer 31, as well as a control operation thereof is monitored by means of the monitoring control circuit section 30a. In the above-mentioned non-volatile program memory 25a, the under-monitoring processing program 27a for cooperation with the monitoring control circuit section 30a has preliminarily been transferred and written from the external tool 13 in addition to the control program 26a.

The monitoring control circuit section 30a that communicates mutually with the microprocessor 20a, via the serial interface circuits 29 and 49 forming a pair of serial-parallel converters, regularly transmits question information to the microprocessor 20a with an inquiry packet. The microprocessor 20a replies answer information with a response packet.

The monitoring control circuit section 30a carries out determination of error using error determination means for comparing correct answer information, which is stored in the non-volatile memory 46, with the above-mentioned answer information. In the case of non-coincidence, the monitoring control circuit section 30a causes a current value C of the error counter 48 to perform the up-count by three counts. In the case of coincidence, the monitoring control circuit section 30a causes a current value C of the error counter 48 to perform the down-count by one count. An initial value of the error counter 48 is set to 11, and a current value thereof is arranged not to be 0 and less. However, when a current value comes to be not less than 13, the monitoring control circuit section 30a generates a count-up output, and resets the microprocessor 20a with a reset pulse signal RST2 to restart it. Further, numbers of an inquiry packet, which is regularly transmitted, are circulated and updated in a sequence of n=1, 2, 3 ... 16, 1, 2 ....

On the other hand, the microprocessor 20a possesses an initiative of the overall control. Regular transmission of question information with the above-mentioned inquiry packet is started upon the fact that the microprocessor 20a has preliminarily transmits the first synchronization packet to the monitoring control circuit section 30a to give permission for transmission of an inquiry packet. In the case where the transmission of any inquiry packet is inhibited by the first synchronization packet, the monitoring control circuit section 30a stops transmitting an inquiry packet. However, to control the case where any transmission permission is not given even if a predetermined time period has passed after the start of operation and an individual operation of the microprocessor 20a is carried out without being monitored, there is provided monitoring permission error processing means. This monitoring permission error processing means performs an alarm display when a predetermined time period has passed.

The monitoring control circuit section 30a carries out a sum check of a response packet having been received, and replies to the microprocessor 20a a confirmation packet of the normal receiving (ACK) or the non-normal receiving (NACK). In case of the non-normal receiving, the microprocessor 20a carries out the retransmission processing of a response packet.

Furthermore, when replying a confirmation packet by the monitoring control section 30a is not carried out after a predetermined time period has passed, the microprocessor 20a resets the monitoring control circuit section 30a with confirmation reply error processing means. In addition, also when a transmission interval of an inquiry packet, the regular transmission of which is permitted, exceeds a predetermined time period, the microprocessor 20a resets the monitoring control circuit section 30a with receiving interval error processing means. Thus, the microprocessor 20a monitors the monitoring control circuit section 30a in reverse.

On the other hand, there is further added monitoring means, by which the monitoring control circuit section 30a resets the microprocessor 20a to restart it with response interval error processing means, when a reply interval of a response packet by the microprocessor 20a exceeds a predetermined time period.

With reference to FIG. 2, the microprocessor 20a carries out alternately the under-test target program 28a and the simulation-operation-execution processing program 28b. The common program 28c, however, is executed with both. Further, a number of the input data group to be processed in the simulation-operation-execution processing program 28b is specified to be a number of 1 to 15 with inquiry data in the inquiry packet having been transmitted from the monitoring control circuit section 30a. The microprocessor 20a brings the common program 28c into operation with the use of an input data group of the specified number, and replies a result thereof to the monitoring control circuit section 30a with a response packet. The number 16 of an inquiry data is specified in order to carry out the incorrect answer processing, and is not processed in the simulation-operation-execution processing program 28b.

With reference to FIGS. 3 and 4, the microprocessor 20a carries out the transmission of the first synchronization packet 61a and the second synchronization packet 62, and thereafter carries out the reply of response packets in order of the response packet 71b, the response packet 72b, . . . the response packet 716b, the response packet 71b, the response packet 72b, . . . The monitoring control circuit section 30a carries out the transmission of inquiry packets in order of the inquiry packet 71a, the inquiry packet 72a, . . . the inquiry packet 716a.

The monitoring control circuit section 30a immediately replies a confirmation packet of the normal receiving (ACK) or the non-normal receiving (NACK) responsive to all the packets having been received from the microprocessor 20a. Whereas, in the case where the microprocessor 20a normally receives an inquiry packet having been received from the monitoring control circuit section 30a, the microprocessor 20a immediately replies the second synchronization packet 62 or the response packet n-1 as confirmation information thereof. However, a content of the response packet n-1 to be replied herein is the one that contains answer information to question information of the last inquiry packet n-1, and is an answer delayed by one timing in order to ensure a time period necessary for the microprocessor 20a to obtain the answer information.

With reference to FIGS. 5 and 6 showing operation from transmitting the first synchronization packet 61a to receiving the first inquiry packet 71a, numeral 102a designates first synchronization packet transmission means, numeral 203a designates receiving-confirmation means, numeral 205a designates receiving-confirmation-response means with a normal confirmation packet 204a or a non-normal confirmation packet 204b, numerals 105a and 106a are retransmission processing means in the case where any normal confirmation packet 63a cannot be obtained, numeral 209a designates monitoring permission error processing means when a first synchronization packet 61a cannot be normally received even if a predetermined time period has passed, numeral 207a designates inquiry packet transmission means, and numeral 115a designates incorrect answer transmission definition means for replying an incorrect answer in the subsequent response packet when there is a sum check error in an inquiry packet 71a that the microprocessor 20a has received.

With reference to FIGS. 7 and 8 showing operations from transmitting the second synchronization packet 62 to receiving the second inquiry packet 72a, numeral 102b designates second synchronization packet transmission means, numeral 203b designates receiving-confirmation means, numeral 205b designates receiving-confirmation-response means with a normal confirmation packet 204c or a non-normal confirmation packet 204d, numerals 105b and 106b are retransmission processing means in the case where any normal confirmation packet 63a cannot be obtained, numeral 209b designates error processing means when the second synchronization packet 62 cannot be received even if a predetermined time period has passed, numeral 207b designates inquiry packet transmission means, and numeral 115b designates incorrect answer transmission determination means for replying an incorrect answer with the subsequent response packet when there is a sum check error in the inquiry packet 72a that the microprocessor 20a has received.

With reference to FIGS. 9 and 10 showing operations from transmitting the response packet 71b to receiving the inquiry packet 73a, numeral 102c designates response packet transmission means, numeral 203c designates receiving-confirmation means, numeral 205c designates receiving-confirmation-response means with a normal confirmation packet 204e or a non-normal confirmation packet 204f, numerals 105c and 106c are retransmission processing means in the case where a normal confirmation packet 63a cannot be obtained, numeral 209c designates response interval error processing means when a response packet 71b cannot be received even if a predetermined time period has passed, and numeral 211 designates error determination means for comparing answer information of the response packet 71b with correct answer information that is stored in the non-volatile data memory 46 (refer to FIG. 1). In the case where the foregoing error determination means 211 determines that it is a correct answer, the count down of the error counter 48 is performed in Step 212. In the case where an incorrect answer is determined, number of counts of the error counter 48 is increased by three. Numeral 207c designates inquiry packet transmission means, and numeral 115c designates incorrect answer transmission determination means for replying an incorrect answer with the subsequent response packet when there is a sum check error in the inquiry packet 73a that the microprocessor 20a has received.

With reference to FIG. 11 showing a transition processing from receiving the inquiry packet 73a to the subsequent circulation cycle, numeral 209d designates a count up output that acts when a current value of the error counter 48 is not less than 13, and resets the microprocessor 20a, numeral 116 designates current value monitoring means for monitoring the change in current value of the error counter 48 having been transmitted from the monitoring control circuit section 30a with an inquiry packet, and numeral 122 designates incorrect answer transmission selection means that acts when number of an inquiry packet having been received is 16, as well as a current value of the error counter 48 is not more than 6. Even if an incorrect answer is transmitted with the subsequent response packet 16, and number of counts of the error counter 48 is increased by three, the count up output means 209d does not operate.

Whereas, in the case of the incorrect answer transmission determination means 115a, 115b, 115c, shown in FIGS. 5 to 10, they are the incorrect answer reply means in the case where there is a sum check error in an inquiry packet having been received. Therefore, the up-count of the error counter 48 is carried out in Step 213 of FIG. 10. When a current value of the error counter 48 comes to be not less than 13, the microprocessor 20a is reset in Step 209d of FIG. 11.

Embodiment 2

Figure 12:
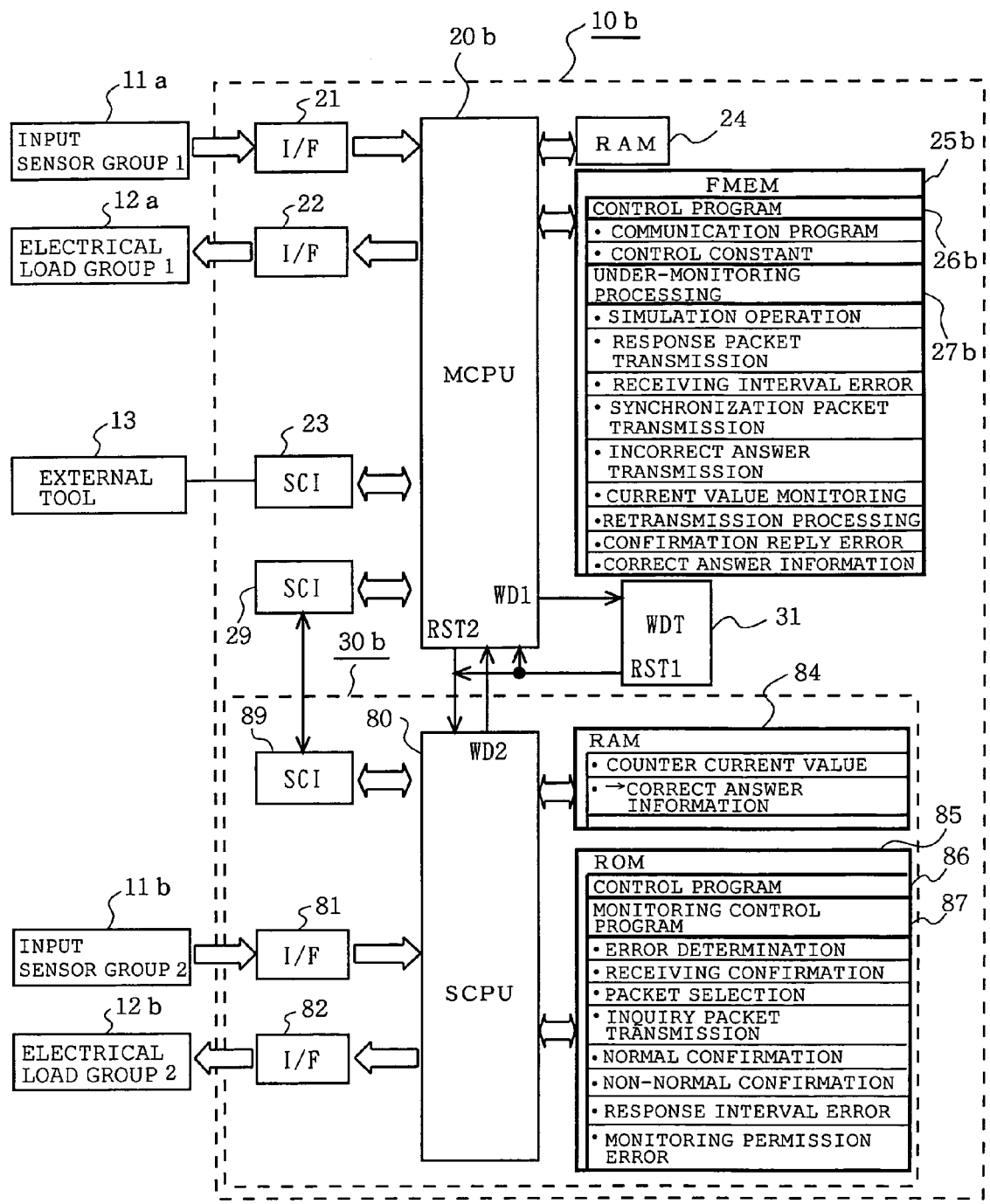
FIG. 12 is an entire block diagram showing an electronic control unit according to a second preferred embodiment of the invention.

FIG. 12 is a schematic diagram showing an entire electronic control unit according to a second preferred embodiment of the present invention. With reference to FIG. 12, an electronic control unit 10b is constructed on a piece of electronic substrate such that a main component thereof is a microprocessor 20a. First, as components connected to outside of the electronic control unit 10b, there are provided a first input sensor group 11a containing an ON/OFF signal or an analog signal, a second input sensor group 11b containing an ON/OFF signal or an analog signal, a first electrical load group 12a driven by the above-mentioned electronic control unit 10b, a second electrical load group 12b driven by the above-mentioned electronic control unit 10b, and an external tool 13 serially connected to the above-mentioned electronic control unit 10b. The external tool 13 is connected to the above-mentioned electronic control unit 10b via a detachable connector, not shown, at the time of delivery of products or a maintenance inspection, and functions to transfer and write a control program 26b or an under-monitoring processing program 27a in a non-volatile program 25b described later.

Next, the above-mentioned electronic control unit 10b includes, as an internal component thereof, a main microprocessor 20b bus-connected to various interface circuits and memories described later, and an input interface circuit 21 provided between this microprocessor 20b and the first input sensor group 11a. With respect to an analog input sensor, an AD converter, not shown, is used. Connected to the microprocessor 20b are an output interface circuit 22 connected between the microprocessor 20b and the first electrical load group 12a; a tool interface circuit 23 connected between the microprocessor 20b and the external tool 13; a RAM memory 24 for an operation processing; and a non-volatile program memory 25b, for example, a flash memory. A variety of programs, which are described in detail with reference to FIGS. 5 to 11, are stored in these program memories. In addition, connected to the microprocessor 20b is a serial interface circuit 29, specifically a serial-parallel converter, provided in order to carry out an interactive serial communication between the microprocessor 20b and an auxiliary microprocessor 80 described later.

Further, as contents of the non-volatile program memory 25b, there are a control program 26b and an under-monitoring processing program 27a. The above-mentioned control program 26b consists of a main control program for carrying out input/output control, as well as a serial communication program with the external tool 13 and the later-described auxiliary microprocessor 80, and a control constant, for example, a threshold data for a comparison processing for use in the input/output control.

In addition, the under-monitoring processing program 27a carries out monitoring control in cooperation with the monitoring control circuit section 30b described later. The foregoing under-monitoring processing program, as described in detail in FIGS. 5 to 11, consists of a simulation-operation-execution processing program, a response packet transmission program, a receiving interval error processing program, a first and second synchronization packet transmission program, an incorrect answer transmission selection program, a current-value monitoring program of an error counter, a retransmission processing program of a response packet, a confirmation reply error processing program, and correct answer information data to be transferred to the later-described auxiliary RAM memory 84.

The monitoring control circuit section 30b is constituted such that an auxiliary microprocessor 80 is a main component, and monitors operations of the microprocessor 20b. An input interface circuit 81 is provided between the auxiliary microprocessor 80 and the second input sensor group 11b. An AD converter, not shown, is used with respect to an analog input sensor. An output interface circuit 82 is connected between the auxiliary microprocessor 80 and the second electrical load group 12b. To the auxiliary microprocessor 80, an auxiliary RAM memory 84 is bus-connected. Further, an auxiliary program memory 85 such as mask ROM or a serial interface circuit 89, specifically a serial-parallel converter that is paired with the above-mentioned serial interface circuit 29, is bus-connected to the auxiliary microprocessor 80 as well.

The watchdog timer 31 monitors pulse width of a watchdog signal WD1 that is a pulse train, which is generated by the microprocessor 20b and the auxiliary microprocessor 80, generates a reset pulse signal RST1 when the foregoing pulse width exceeds a predetermined value, and causes the microprocessor 20b to restart. A watchdog signal WD2 is a pulse train that the auxiliary microprocessor 80 generates. A reset pulse signal SRT2 is generated in order to restart the auxiliary microprocessor 80 when pulse width of the watchdog signal WD2, which is monitored by the microprocessor 20b, exceeds a predetermined value.

Further, in the auxiliary RAM memory 84, a current value of an error counter counted by the auxiliary microprocessor 80 is stored, or correct answer information having once been stored in the non-volatile program memory 25b is transferred and written. Furthermore, in the auxiliary program memory 85, an input/output control program 86 and a monitoring control program 87 are stored. The above-mentioned input/output control program 86 is a program in order to serially transmit an input signal from, e.g., the second input sensor group 11b to the microprocessor 20b, or to serially transmit a control output from the microprocessor 20b to the second electrical load group 12b.

The following programs are provided in the monitoring control program 87. These programs include error determination means for determining whether or not a content of a response packet that the microprocessor 20b replies to a content of an inquiry packet that the auxiliary microprocessor 80 has transmitted; receiving-confirmation means for carrying out a sum check of contents of received data having been transmitted from the microprocessor 20b; receiving-confirmation-response means for selecting a normal confirmation packet (ACK) or a non-normal confirmation packet (NACK) as a confirmation packet corresponding to a content of the received data; inquiry packet transmission means: response interval error processing means for resetting the microprocessor 20b when a receiving interval of a response packet to be transmitted from the microprocessor 20b is abnormal; and monitoring permission error processing means for performing an alarm display when the microprocessor 20b gives no start permission for a monitoring operation with respect to the auxiliary microprocessor 80 even if a predetermined time period has passed after the start of operation.

As is clear from the above-mentioned descriptions, difference between the electronic control unit according to the second embodiment shown in FIG. 12 and the electronic control unit according to the first embodiment shown in FIG. 1 is as follows. That is, the monitoring control circuit section 30a of FIG. 1 is constituted of a logic circuit having no microprocessor, while the monitoring control circuit section 30b of FIG. 12 is constituted such that the operations equivalent to that of FIG. 1 are carried out by the auxiliary microprocessor 80 and the auxiliary program memory 85. The auxiliary microprocessor 80 also possesses a function to transmit an input/output signal. It is also preferable that the auxiliary microprocessor 80 shares function with the microprocessor 20b, and carries out a part of input/output controls, or that the auxiliary microprocessor 80 is dedicated solely in the monitoring control to the microprocessor 20b without processing any input/output.

Embodiment 3

Figure 13A:
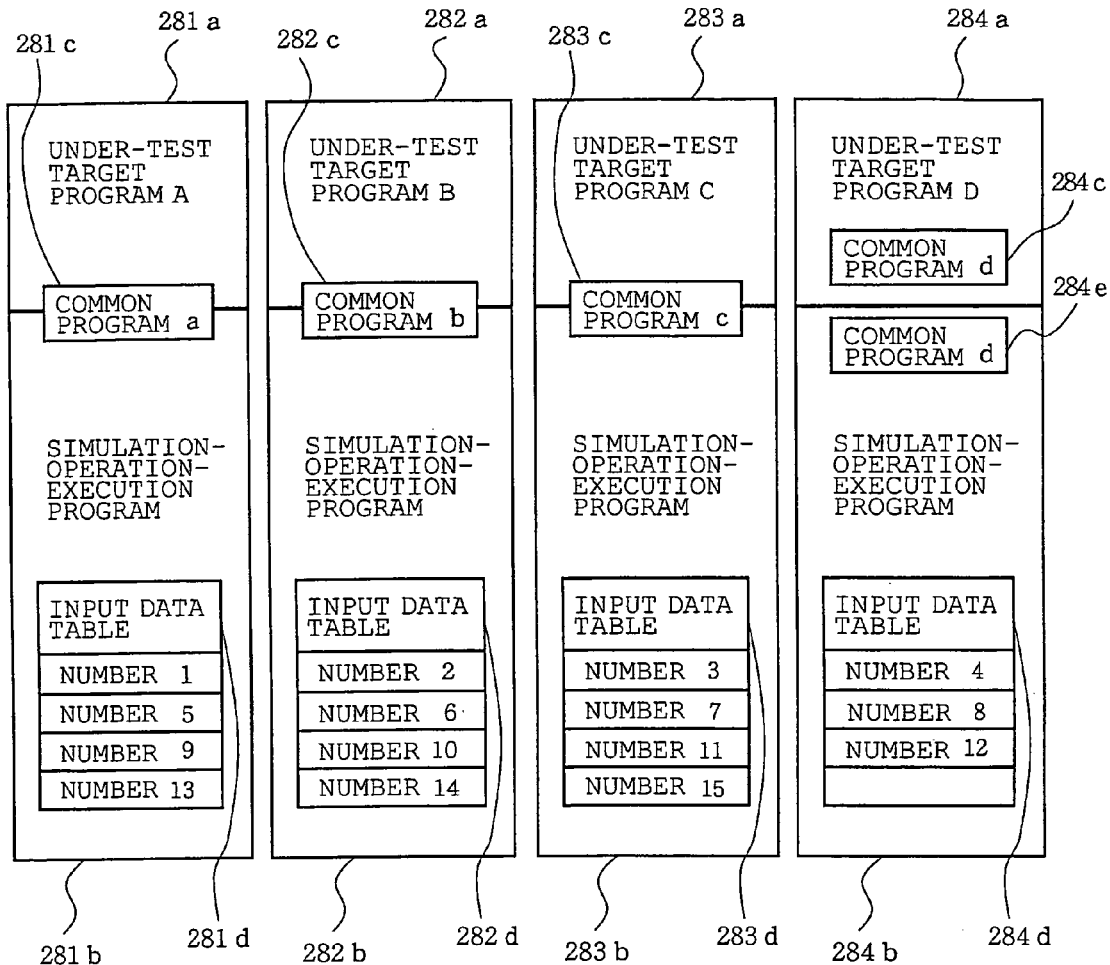
FIGS. 13(A) and(B) are a partially equivalent control block diagram of an electronic control unit according to a third preferred embodiment of the invention.

FIGS. 13(A) and (B) show a partially equivalent control block diagram in an electronic control unit according to a third preferred embodiment of the invention. With reference to FIG. 13(A), an under-test target program A281a is a program that is stored as a part of the control program 26a in the non-volatile program 25a instead of the under-test target program 28a of FIG. 2. A simulation-operation-execution processing program 281b is a program that is stored as a part of the under-monitoring processing program 27a in the non-volatile program memory instead of the simulation-operation-execution processing program 28b of FIG. 2. A common program 281c is a program that is executed when either the under-test target program 281a or the simulation-operation-execution processing program 281b is carried out. An input data table 281d is processed in the above-mentioned simulation-operation-execution processing program 281b. Further, under-test target programs 282a, 283a, 284a or simulation-operation-execution processing programs 282b, 283b, 284b are constituted likewise. In addition, common programs 282c, 283c, are constituted likewise. In this third embodiment, the under-test target program 28a is divided into a plurality of under-test target programs 281a–284a as compared with the foregoing embodiment of FIG. 2.

The above-mentioned under-test target programs 281a to 184a are sub-routine programs for use in local places of, e.g., the control program 26b. Input information to be processed herein is not necessarily the information having been inputted from the input sensor group 11, but intermediate information in the course of operation is used. Furthermore, as for the under-test target program 284a and the simulation-operation-execution processing program 284b, there is shown an example that a common program d is separated and stored in respective program regions to be common programs 284c and 284e.

Figure 13B:
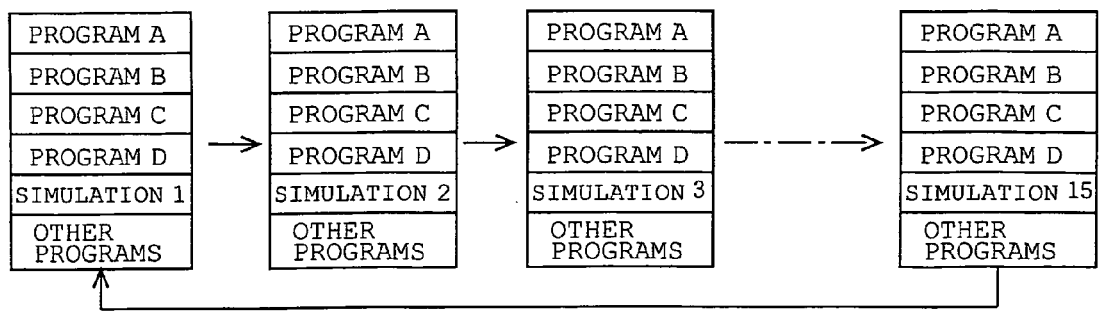

Execution order of these programs is as shown in FIG. 13(B). A first stage is carried out in order of the under-test target program 281a (containing the common program 281c) →the under-test target program 282a (containing the common program 282c)→the under-test target program 283a (containing the common program 283c)→the under-test target program 284a (containing the common program 284c) →the simulation-operation-execution processing program 281b (that contains the common program 281c, and an input data number thereof is 1)→the other whole control programs.

Next, the programs are carried out in order of the under-test target program 281a (containing the common program 281c)→the under-test target program 282a (containing the common program 282c)→the under-test target program 283a (containing the common program 283c)→the under-test target program 284a (containing the common program 284c)→the simulation-operation-execution processing program 282b (that contains the common program 282c, and an input data number thereof is 2)→the other whole control programs.

Thereafter, the programs are carried out likewise in order of the under-test target program 281a (containing the common program 281c)→the under-test target program 282a (containing the common program 282c)→the under-test target program 283a (containing the common program 283c) →the under-test target program 284a (containing the common program 284c)→the simulation-operation-execution processing program 283b (that contains the common program 283c, and an input data number thereof is 3)→the other whole control programs.

Next, the programs are carried out in order of the under-test target program 281a (containing the common program 281c)→the under-test target program 282a (containing the common program 282c)→the under-test target program 283a (containing the common program 283c)→the under-test target program 284a (containing the common program 284c)→the simulation-operation-execution processing program 284b (that contains the common program 284e, and an input data number thereof is 4)→the other whole control programs.

Thereafter, likewise the simulation-operation-execution processing programs corresponding to the input data numbers 5 to 15 are carried out. The input data numbers 1–15 are sequentially distributed and allocated to the overall simulation-operation-execution processing programs without being concentrated on a specified simulation-operation-execution processing program. Accordingly, when there is any error in any of the under-test target programs 281a to 284a, the error is more likely to be immediately detected. In addition, the incorrect answer reply processing with the sixteenth inquiry packet is carried out subsequent to the inquiry packet assigned with an input data number of 15, and thereafter the processing program is circulated to return to the inquiry packet assigned with an input data number of 1.

Other Embodiment

As is clear from the descriptions heretofore, in an electronic control unit that is constituted of a microprocessor according to this invention, a control operation of the above-mentioned microprocessor is monitored by means of a monitoring control circuit section that is serially connected to the microprocessor. There are various modifications of the monitoring control circuit section such as monitoring control circuit section constituted of a logic circuit without microprocessor, or the monitoring control circuit section including an auxiliary sub-microprocessor and sharing functions.

Further, as a simulation-operation-execution processing program, a dedicated simulation operation program irrelevant to an under-test target program can be used. It is, however, preferable that the under-test target program is established and the simulation-operation-execution processing program that uses the same common program as that used in the foregoing under-test target program may be created.

Furthermore, to prevent reduction in safety as the whole due to a more complicated system resulted from addition of a monitoring control circuit section, it is desirable to use a watchdog timer together.

Besides, the monitoring control circuit section does not merely monitor the control operation of the microprocessor, but also the microprocessor and the monitoring control circuit section carries out a mutual monitoring in which communication interval error determination is performed each other thereby enabling to improve safety of the system.

As described heretofore, in the foregoing embodiments, a simulation-operation-execution processing program has an input data table. It is, however, also preferable that input data for use in the simulation operation are transmitted from the monitoring control circuit section with an inquiry packet.

In addition, the microprocessor is to reply, with a response packet, an execution result of the simulation operation. However, it is possible that a correct answer number is selected depending on an execution result, and the correct answer number having been selected is replied with a response packet. A correct answer number table for this case is stored in the non-volatile program memory and, therefore, when an execution result of the simulation operation of the microprocessor is incorrect, a correct answer number to be selected will not be found. Accordingly, in this case, it is preferable that a predetermined incorrect answer number is replied.

In the foregoing descriptions, it is arranged such that when the microprocessor resets the monitoring control circuit section, the microprocessor interrupts a control flow of the monitoring control circuit section to cause it to return to an operation start step, initializes again a process counter or error counter within the monitoring control circuit section, and thereafter restarts a monitoring control operation. In addition, the microprocessor itself is to return to the operation start step.

Further, it is arranged such that when the monitoring control circuit section resets the microprocessor, it restarts the microprocessor with a reset pulse signal, and the monitoring control circuit section itself returns to the operation start step.

As described above, the automatic restart of the microprocessor and the monitoring control circuit section at the time of occurrence of any error is appropriate for the purpose of preventing any sensitive action of responding to a primary malfunction due to, e.g., noise. It is also possible to change the system so as to apply an interlock in which a control operation is stopped to give an alarm upon occurrence of any error, and the microprocessor and monitoring control circuit section are not restarted without pressing a start button manually.

In the foregoing description, the method by sum check operation is employed as means for determining any lack or mix in bit information. As alternative means substituting for the sum check operation described herein, another method has been put in practical use. In this alternative method, plural data are transmitted, and a binary addition value of the transmitted plural data is divided by a predetermined value with a remainder being added and also transmitted to the other side. The determination side having received the plural data and the remainder likewise carries out addition and division to obtain a remainder to determine whether or not the obtained remainder is coincident to the received remainder.

Further, in the foregoing description, the error counter is so arranged as to carry out down-count when discriminating a normal receiving and up-count when discriminating an abnormal receiving and announce an error when a current value exceeds a predetermined value.

It is also preferable that the error counter is so arranged as to carry out the operations in reverse order. That is, the error counter set to a predetermined initial value carries out up-count when discriminating a normal receiving and limit a current value thereof so as to remain within a predetermined upper limit value. On the other hand, down-count is carried out when discriminating an abnormal receiving and an error is announced when the current value comes to zero.

Now, additional features and advantages of the electronic control unit including a monitoring control circuit according to the invention are described below.

An electronic control unit according to the invention is arranged such that a simulation-operation-execution processing program includes an input data table, and an under-test target program and a simulation-operation-execution processing program are carried out alternately, and in which input data to be processed in the mentioned simulation-operation-execution processing program is selected in sequence from the mentioned input data table corresponding to a content of an inquiry packet.

As a result, it is possible to carry out a simulation operation using a variety of input data, thereby enabling to reliably detect any error; and it is unnecessary to transmit input data from the monitoring control circuit section, thereby enabling to improve responsibility in communication.

Further, the electronic control unit according to the invention is arranged such that an under-test target program is divided into a plurality of groups; a simulation-operation-execution processing program with respect to each group includes an input data table corresponding to this processing program; and an input data group is sequentially selected with an inquiry packet.

As a result, it is possible to divide a complicated under-test target program and monitor the divided programs thereby enabling to easily detect error, and the sequential simulation operation of the under-test target programs having been divided enables to detect any error at once.

Further, the electronic control unit according to the invention is arranged such that a non-volatile program memory includes a control program for an input/output control having been transferred and written from an external tool that is serially connected via a tool interface circuit; an under-monitoring processing program acting as under-monitoring processing means; and correct answer information data to a question information; and in which the correct answer information data is transferred again to correct answer information storage means that is provided in the monitoring control circuit section.

As a result, in the case where a simulation-operation-execution processing program is changed, a correct answer information data thereof is changed at the same time, thereby enabling to unify a change management of the programs.

Further, the electronic control unit according to the invention is arrange such that the monitoring control circuit section includes an auxiliary microprocessor consisting of an auxiliary program memory and an auxiliary RAM memory.

As a result, changing a content of the auxiliary program memory enables to readily change a content of the monitoring control. Further, supposing that the monitoring control circuit section possesses a specified function other than the monitoring control, it is possible to reduce burden of the microprocessor that is a main component.

Further, the electronic control unit according to the invention is arranged such that the microprocessor replies a response packet corresponding to a content of the last n-1th inquiry packet immediately after receiving the nth inquiry packet having been transmitted from the monitoring control circuit section; and replying this response packet also serves as recognition information with respect to having received the nth inquiry packet.

As a result, it is possible to reduce communication information; and it is unnecessary that the microprocessor waits for an undetermined time period in order to carry out the simulation operation thereby enabling to perform a high-speed communication.

Further, the electronic control unit according to the invention is arranged such that the under-monitoring processing means includes first synchronization packet transmission means for transmitting a first synchronization packet that is transmitted to the mentioned monitoring control circuit section, and the monitoring control circuit section includes monitoring permission error processing means.

As a result, it is possible that the microprocessor has an initiative in determining the permission/inhibition of the monitoring control. In addition, when the regular transmission permission of any inquiry packet cannot be obtained from the first synchronization packet even if a predetermined time period has passed after the start of operation, it is possible to perform an error annunciation by the monitoring permission error processing means.

Further, the electronic control unit according to the invention is arranged such that the under-monitoring processing means includes second synchronization packet transmission means for transmitting a second synchronization packet that is transmitted to the monitoring control circuit section, and this second synchronization packet transmission means acts as recognition means with respect to receiving the first inquiry packet of a first cycle that the mentioned monitoring control circuit section has transmitted; and a response packet responsive to the last inquiry packet is replied when the first inquiry packet of the next cycle is received.

As a result, it is possible to reduce communication information while carrying out a circulation operation, thereby enabling to perform a high-speed communication.

Further, the electronic control unit according to the invention is arranged such that the monitoring control circuit section includes receiving-confirmation means and an error counter; and the monitoring control circuit section restarts, or alarms and stops the microprocessor with a count up output when a current value of the mentioned error counter gets out of the error side limit value.

As a result, it is possible to prevent a sensitive response to a temporary noise malfunction; and it is possible to restart, or alarm and stop the microprocessor immediately in the case where the error is continued, thereby enabling to ensure safety.

Further, the electronic control unit according to the invention is arranged such that an inquiry packet contains current value information of the error counter; and the non-volatile program memory includes a program acting as incorrect answer transmission selection means and current value monitoring means.

As a result, it is possible to restart, or alarm and stop the monitoring control circuit section when error determination means of the monitoring control circuit section does not operate normally, thereby enabling to improve safety.

Further, the electronic control unit according to the invention is arranged such that the non-volatile program memory includes a program acting as incorrect answer transmission determination means.

As a result, when content of an inquiry packet having been received from the monitoring control circuit section is an error of lack or mix in bit information, the incorrect answer transmission determination means acts, and makes a content of a response packet to be transmitted next time a predetermined incorrect answer, thereby enabling to increase or decrease a current value of the error counter.

Further, the electronic control unit according to the invention is arranged such that the monitoring control circuit section includes receiving-confirmation-response means and response interval error processing means; and the non-volatile program memory comprises a retransmission processing program acting as retransmission processing means and a processing program acting as confirmation reply error processing means.

As a result, interval time period as to the communication of a response packet is mutually monitored, and the microprocessor and the monitoring control circuit section is restarted, or alarmed and stopped in case of any error, thereby enabling to improve safety.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An electronic control unit having a monitoring control circuit comprising: a non-volatile program memory, an operation processing RAM memory, an input interface circuit to which an input sensor group is connected, an output interface circuit to which an electrical load group is connected, and a microprocessor controlling the mentioned electrical load group responsive to a content of a control program that is stored in said non-volatile program memory, and an operation state of said input sensor group;
wherein the electronic control unit further comprises:
a monitoring control circuit section that is connected to said microprocessor via a pair of serial interface circuits, and includes inquiry packet transmission means for sequentially transmitting regularly question information to said microprocessor; correct answer information storage means to said question information; and error determination means for comparing answer information based on said question information with correct answer information that is stored in said correct answer information storage means to determine presence or absence of any error; and
under-monitoring processing means that is an under-monitoring processing program stored in said non-volatile program memory in addition to the control program for input/output control, and includes: simulation-operation-execution processing means that is executed based on the question information having been transmitted by said inquiry packet transmission means; response packet transmission means for transmitting an execution result of said simulation-operation-execution processing means as an answer information to said monitoring control circuit section; and receiving interval error processing means that is reverse monitoring means for restarting, or alarming and stopping said monitoring control circuit section when a receiving interval of said inquiry packet is abnormal; and
wherein, an under-test target program that is contained in said control program and a simulation-operation-execution processing program serving as simulation-operation-execution processing means and contained in said under-monitoring processing program include at least some common programs.

2. The electronic control unit having the monitoring control circuit according to claim 1, wherein said simulation-operation-execution processing program includes an input data table, said under-test target program and said simulation-operation-execution processing program are carried out alternately, and input data to be processed in said simulation-operation-execution processing program are selected in sequence from said input data table corresponding to a content of said inquiry packet.

3. The electronic control unit having the monitoring control circuit according to claim 1, wherein said under-test target program is divided into a plurality of groups; said simulation-operation-execution processing program relative to each group includes an input data table corresponding to said processing program; and said inquiry packet selects one input data group from the whole of said input data tables, and then sequentially selects the subsequent input data group after said simulation-operation-execution processing program to which a selected input data group belongs and each said under-test target program has been carried out.

4. The electronic control unit having the monitoring control circuit according to claim 1, wherein said non-volatile program memory includes: said control program for an input/output control having been transferred and written from an external tool that is serially connected via a tool interface circuit; said under-monitoring processing program acting as said under-monitoring processing means; and a correct answer information data to a question information, and said correct answer information data are transferred again to said correct answer information storage means that is provided in said monitoring control circuit section.

5. The electronic control unit having the monitoring control circuit according to claim 1, wherein said monitoring control circuit section includes an auxiliary microprocessor comprising an auxiliary program memory and an auxiliary RAM memory; said auxiliary program memory is storage means of a program corresponding to said inquiry packet transmission means and said error determination means; and said auxiliary RAM memory is storage means of a correct information that has preliminarily been stored in said non-volatile program, and is transferred and written at the time of starting operation to be applied in said auxiliary microprocessor; and said auxiliary microprocessor carries out said transmission of an inquiry packet and said error determination in cooperation with said auxiliary program memory, and carries out transfer processing of correct information to said auxiliary RAM memory in cooperation with said microprocessor.

6. The electronic control unit including the monitoring control circuit according to claim 1, wherein said microprocessor replies a response packet corresponding to a content of a last n-1th inquiry packet immediately after receiving a nth inquiry packet having been transmitted from said monitoring control circuit section; and replying said response packet also functions as recognition information relative to having received said nth inquiry packet.

7. The electronic control unit including the monitoring control circuit according to claim 6, wherein said under-monitoring processing means includes transmission means of a first synchronization packet that is transmitted to said monitoring control circuit section, and that contains information permitting or inhibiting for said monitoring control circuit section to regularly transmit said inquiry packet; and wherein said monitoring control circuit section includes monitoring permission error processing means that acts when said monitoring control circuit section is incapable of getting a regular transmission permission with said first synchronization packet, and carries out any one of alarm and stop, restart, and alarm display.

8. The electronic control unit including the monitoring control circuit according to claim 7, wherein said under-monitoring processing means includes transmission means of a second synchronization packet that is transmitted to said monitoring control circuit section, and functions as recognition means for recognizing the receiving of a first inquiry packet of a first cycle that said monitoring control circuit section has transmitted; and a response packet responsive to the last inquiry packet is replied when the first inquiry packet of the next cycle has been received.

9. The electronic control unit having the monitoring control circuit according to claim 1, wherein said monitoring control circuit section includes receiving-confirmation means for discriminating whether it is a normal receiving or a non-normal receiving with a determination result of lack or mix in bit information of at least response packets that are transmitted from said microprocessor out of various received packets, and further includes an error counter having a predetermined initial value; and wherein subtracting or adding count is performed until a current value of said error counter reaches a predetermined normal side limit value when receiving of said receiving-confirmation means is discriminated normal, and adding or subtracting count of the current value of said error counter is performed by a plurality of counts in a direction different from that of said normal side limit value when a content of the response packet is discriminated incorrect by said error determination means even if the normal receiving is discriminated; and said microprocessor is restarted, or alarmed and stopped when a current value of said error counter gets out of a predetermined error side limit value.

10. The electronic control unit having the monitoring control circuit according to claim 9, wherein said inquiry packet contains current value information of said error counter; and wherein said non-volatile program memory comprises a program acting as:

incorrect answer transmission selection means that acts when a current value of said error counter is within a predetermined tolerance, and transmits said response packet, which is an intentionally incorrect answer not corresponding to a content of the last inquiry packet; and current value monitoring means functioning as reverse monitoring means for monitoring whether or not said monitoring control circuit section recognizes that an incorrect answer has been received and that a current value of said error counter is increased or decreased, and for restarting, or alarming and stopping said monitoring control circuit section when said error determination means of said monitoring control circuit section is not operated normally.

11. The electronic control unit having the monitoring control circuit according to claim 9, wherein said non-volatile program memory includes incorrect answer transmission determination means that is a program that acts when a content of said inquiry packet having been received from said monitoring control circuit section is lack or mix in error of bit information, and the program determines that a content of said response packet to be transmitted subsequently is a predetermined incorrect answer.

12. The electronic control unit including the monitoring control circuit according to claim 1, wherein said monitoring control circuit section includes:

receiving-confirmation-response means that carries out discrimination between normal receiving and non-normal receiving with a determination result of lack and mix in bit information of at least said response packets to be transmitted from said microprocessor out of various received packets, and selects a normal confirmation packet or a non-normal confirmation packet in accordance with said determination result to reply it to said microprocessor; and response interval error processing means that acts when a response packet is not replied from said microprocessor even if a predetermined time period has passed from transmission of said inquiry packet or when said non-normal receiving continues, and restarts, or alarms and stops said microprocessor;

wherein said non-volatile program memory includes a processing program that acts as retransmission processing means by which the microprocessor having received said non-normal confirmation packet transmits said response packet again; and acts as confirmation reply error processing means that acts when a time period from transmitting said response packet to receiving a normal confirmation packet exceeds a predetermined value, and restarts, or alarms and stops said monitoring control circuit section.

13. An electronic control unit having a monitoring control circuit comprising: a non-volatile program memory, an operation processing RAM memory, an input interface circuit to which an input sensor group is connected, an output interface circuit to which an electrical load group is connected, and a microprocessor controlling said electrical load group responsive to a content of said non-volatile program memory, and an operation state of said input sensor group;
wherein the electronic control unit further comprises:
a monitoring control circuit section that is connected to said microprocessor via a pair of serial interface circuits, and includes inquiry packet transmission means for sequentially transmitting regularly question information to said microprocessor; correct answer information storage means to said question information; and error determination means for comparing answer information based on said question information with correct answer information that is stored in said correct answer information storage means to determine presence or absence of any error; and
under-monitoring processing means that is an under-monitoring processing program stored in said non-volatile program memory and includes: simulation-operation-execution processing means that is executed based on the question information having been transmitted by said inquiry packet transmission means; response packet transmission means for transmitting an execution result of said simulation-operation-execution processing means as an answer information to said monitoring control circuit section; receiving interval error processing means that is reverse monitoring means for restarting, or alarming and stopping said monitoring control circuit section when a receiving interval of said inquiry packet is abnormal; and
a watchdog timer that generates a reset pulse signal when a pulse width of a watchdog signal, being a pulse train that said microprocessor generates, exceeds a predetermined value to restart, or alarm and stop said microprocessor and said monitoring control circuit section; and
wherein operation of said microprocessor is monitored by said watchdog timer and said monitoring control circuit section, and said microprocessor monitors in reverse monitoring control operation of said monitoring control circuit section.

14. The electronic control unit having the monitoring control circuit according to claim 13, wherein said non-volatile program memory includes: said control program for an input/output control having been transferred and written from an external tool that is serially connected via a tool interface circuit; said under-monitoring processing program acting as said under-monitoring processing means; and a correct answer information data to a question information, and said correct answer information data are transferred again to said correct answer information storage means that is provided in said monitoring control circuit section.

15. The electronic control unit having the monitoring control circuit according to claim 13, wherein said monitoring control circuit section includes an auxiliary microprocessor comprising an auxiliary program memory and an auxiliary RAM memory; said auxiliary program memory is storage means of a program corresponding to said inquiry packet transmission means and said error determination means; and said auxiliary RAM memory is storage means of a correct information that has preliminarily been stored in said non-volatile program, and is transferred and written at the time of starting operation to be applied in said auxiliary microprocessor; and
said auxiliary microprocessor carries out said transmission of an inquiry packet and said error determination in cooperation with said auxiliary program memory, and carries out transfer processing of correct information to said auxiliary RAM memory in cooperation with said microprocessor.

16. The electronic control unit including the monitoring control circuit according to claim 13, wherein said microprocessor replies a response packet corresponding to a content of a last n-1th inquiry packet immediately after receiving a nth inquiry packet having been transmitted from said monitoring control circuit section; and replying said response packet also functions as recognition information relative to having received said nth inquiry packet.

17. The electronic control unit including the monitoring control circuit according to claim 16, wherein said under-monitoring processing means includes transmission means of a first synchronization packet that is transmitted to said monitoring control circuit section, and that contains information permitting or inhibiting for said monitoring control circuit section to regularly transmit said inquiry packet; and
wherein said monitoring control circuit section includes monitoring permission error processing means that acts when said monitoring control circuit section is incapable of getting a regular transmission permission with said first synchronization packet, and carries out any one of alarm and stop, restart, and alarm display.

18. The electronic control unit having the monitoring control circuit according to claim 13, wherein said monitoring control circuit section includes receiving-confirmation means for discriminating whether it is a normal receiving or a non-normal receiving with a determination result of lack or mix in bit information of at least response packets that are transmitted from said microprocessor out of various received packets, and further includes an error counter having a predetermined initial value; and
wherein subtracting or adding count is performed until a current value of said error counter reaches a predetermined normal side limit value when receiving of said receiving-confirmation means is discriminated normal, and adding or subtracting count of the current value of said error counter is performed by a plurality of counts in a direction different from that of said normal side limit value when a content of the response packet is discriminated incorrect by said error determination means even if the normal receiving is discriminated; and said microprocessor is restarted, or alarmed and stopped when a current value of said error counter gets out of a predetermined error side limit value.

19. The electronic control unit having the monitoring control circuit according to claim 18, wherein said inquiry packet contains current value information of said error counter; and
wherein said non-volatile program memory comprises a program acting as:
incorrect answer transmission selection means that acts when a current value of said error counter is within a predetermined tolerance, and transmits said response packet, which is an intentionally incorrect answer not corresponding to a content of the last inquiry packet; and
current value monitoring means functioning as reverse monitoring means for monitoring whether or not said monitoring control circuit section recognizes that an incorrect answer has been received and that a current value of said error counter is increased or decreased, and for restarting, or alarming and stopping said monitoring control circuit section when said error determination means of said monitoring control circuit section is not operated normally.

20. The electronic control unit including the monitoring control circuit according to claim 13, wherein said monitoring control circuit section includes:
- receiving-confirmation-response means that carries out discrimination between normal receiving and non-normal receiving with a determination result of lack and mix in bit information of at least said response packets to be transmitted from said microprocessor out of various received packets, and selects a normal confirmation packet or a non-normal confirmation packet in accordance with said determination result to reply it to said microprocessor; and
- response interval error processing means that acts when a response packet is not replied from said microprocessor even if a predetermined time period has passed from transmission of said inquiry packet or when said non-normal receiving continues, and restarts, or alarms and stops said microprocessor;

wherein said non-volatile program memory includes a processing program that acts as retransmission processing means by which the microprocessor having received said non-normal confirmation packet transmits said response packet again; and acts as confirmation reply error processing means that acts when a time period from transmitting said response packet to receiving a normal confirmation packet exceeds a predetermined value, and restarts, or alarms and stops said monitoring control circuit section.

* * * * *